US009227715B1

(12) United States Patent
Raetzman et al.

(10) Patent No.: US 9,227,715 B1
(45) Date of Patent: Jan. 5, 2016

(54) MARINE PROPULSION SYSTEM GEAR CASE ASSEMBLY

(71) Applicant: BRP US INC., Sturtevant, WI (US)

(72) Inventors: Roger Raetzman, Pleasant Prairie, WI (US); Simon Pfiffner, Deerfield, IL (US); Michael Freitag, Kenosha, WI (US); Mark C. Noble, Pleasant Prairie, WI (US); John Feuerstein, Racine, WI (US)

(73) Assignee: BRP US INC., Sturtevant, WI (US)

( * ) Notice: Subject to any disclaimer, the term of this patent is extended or adjusted under 35 U.S.C. 154(b) by 0 days.

(21) Appl. No.: 14/169,725

(22) Filed: Jan. 31, 2014

Related U.S. Application Data

(60) Provisional application No. 61/759,184, filed on Jan. 31, 2013.

(51) Int. Cl.
  *B63H 20/14* (2006.01)
  *B63H 20/32* (2006.01)
  *B63H 20/00* (2006.01)
  *F16H 57/02* (2012.01)

(52) U.S. Cl.
  CPC .............. *B63H 20/32* (2013.01); *B63H 20/002* (2013.01); *B63H 20/14* (2013.01); *F16H 57/02* (2013.01)

(58) Field of Classification Search
  USPC ............................................. 440/75
  IPC B63H 23/00,20/32, 20/14, 20/002; F16H 57/02
  See application file for complete search history.

(56) References Cited

U.S. PATENT DOCUMENTS

| 5,379,874 | A | * | 1/1995 | Fujita et al. | 192/85.39 |
| 2004/0007488 | A1 | * | 1/2004 | Soehnlen et al. | 206/431 |
| 2004/0216555 | A1 | * | 11/2004 | Ide et al. | 74/606 R |

FOREIGN PATENT DOCUMENTS

JP 53-24098 * 10/1977

* cited by examiner

*Primary Examiner* — Stephen Avila
(74) *Attorney, Agent, or Firm* — BCF LLP

(57) ABSTRACT

A gear case assembly for a marine propulsion system has a gear case having a first end adapted to connect the gear case to a remainder of the marine propulsion system, and a second end disposed opposite the first end. A driveshaft is disposed at least in part in the gear case. A propeller shaft, operatively connected to an end of the driveshaft, is disposed at an angle thereto. The end of the driveshaft and at least a portion of the propeller shaft are disposed in a transmission chamber defined in the gear case. An expansion port is defined in the gear case. A container, defining an expansion chamber, is disposed outside the gear case. The expansion port fluidly communicates the transmission chamber with the expansion chamber. An outboard engine is also disclosed.

22 Claims, 18 Drawing Sheets

MARINE PROPULSION SYSTEM GEAR CASE ASSEMBLY

CROSS-REFERENCE

The present application claims priority to U.S. Provisional Patent Application No. 61/759,184 filed on Jan. 31, 2013, the entirety of which is incorporated herein by reference.

FIELD OF THE INVENTION

The present invention relates to a marine propulsion system gear case assembly.

BACKGROUND

Marine propulsion systems, such as marine outboard engines, typically include a gear case assembly for transmitting torque from the engine to the propeller or impeller of the propulsion system. The gear case assembly includes a gear case housing various components, such as shafts, gears and the like, that are used to achieve this torque transmission. At least some of these components, which may be housed in different interconnected chambers and passages formed within the gear case, are immersed in lubricant. During operation of the propulsion system, the lubricant is circulated through various chambers and passages of the gear case and around the various components. The operation of the engine causes heating of the lubricant in the gear case. The heated lubricant expands, occupying more space than the cold lubricant. In a sealed gear case filled with oil, this would raise the pressure therein significantly. It is therefore common to provide a certain amount of air within the gear case that can be compressed so as to compensate for the expansion of the lubricant and to prevent the pressure within the gear case from reaching an unacceptably high level.

Most gear case assemblies have sufficiently large volumes and a sufficient amount of compressible air therein to accommodate the expansion of the lubricant. The expansion of the lubricant during operation of the engine can however be a problem in some gear case assemblies where the overall volume of the chambers and passages is relatively small. One example of such a gear case assembly where the overall volume of the chambers and passages is relatively small is a gear case assembly which includes an electric actuator for controlling the shift between forward and reverse operation of the propeller. The electric actuator is housed inside the gear case but isolated from the chambers and passages in which lubricant is present, thus reducing the volume that could otherwise be available for lubricant and air.

There is therefore a need for an outboard engine and a gear case assembly that can accommodate a sufficient amount of lubricant as well as expansion of the lubricant without also increasing the overall volume of the gear case or the propulsion system.

SUMMARY

It is an object of the present invention to ameliorate at least some of the inconveniences present in the prior art.

In one aspect, a gear case assembly for a marine propulsion system has a gear case having a first end adapted to connect the gear case to a remainder of the marine propulsion system, and a second end disposed opposite the first end. A driveshaft, having a driveshaft axis, is disposed at least in part in the gear case. A propeller shaft, operatively connected to an end of the driveshaft, is disposed at an angle thereto. The end of the driveshaft and at least a portion of the propeller shaft are disposed in a transmission chamber defined in the gear case. An expansion port, defined in the gear case, fluidly communicates the transmission chamber with an exterior of the gear case.

In another aspect, expansion port is defined in the first end of the gear case

In yet another aspect, the gear case defines a driveshaft passage fluidly connected to the transmission chamber. The driveshaft passage houses at least a portion of the driveshaft. The driveshaft passage is disposed between the first end of the gear case and the transmission chamber in a direction parallel to the driveshaft axis. The expansion port fluidly communicates with the transmission chamber via the driveshaft passage.

In a further aspect, the gear case defines a lubricant opening in the driveshaft passage, and the expansion port fluidly communicates with the lubricant opening.

In an additional aspect, the gear case defines a connection passage fluidly connecting the expansion port and the lubricant opening.

In another aspect, the connection passage fluidly communicates with a lubricant filling port. The lubricant filling port fluidly communicates the transmission chamber with an exterior of the gear case.

In yet another aspect, an expansion conduit defining an expansion passage that fluidly communicates the expansion port with the expansion chamber.

In another aspect, a transmission is operatively connected to the driveshaft and the propeller shaft. The transmission is selectively operatively connected to at least one of the propeller shaft and the driveshaft. The driveshaft thereby selectively drives the propeller shaft via the transmission. A transmission actuator is disposed in an actuator chamber defined by the gear case. The actuator chamber is sealed from the transmission chamber. A volume of the expansion chamber and the expansion passage is at least as great as a volume of the gear case occupied by the actuator chamber.

In a further aspect, at least a portion of the container defining the expansion chamber is at least partially transparent.

In a further aspect, the portion of the container has defined thereon a visual indicator for indicating the level of lubricant within the container.

In another aspect, the visual indicator is a fill line.

In an additional aspect, the container includes a vent port fluidly communicating the expansion chamber with an exterior of the container.

In a further aspect, the vent port selectively fluidly communicates the expansion chamber with the exterior of the container.

In another aspect, the container includes a check valve for selectively preventing entry of water from an exterior of the container into the expansion chamber through the vent port.

In another aspect, the check valve is a ball valve.

In yet another aspect, the vent port fluidly communicates with a vent passage, and the check valve is disposed in the vent passage.

In another aspect, the present provides a marine outboard engine having an engine, a cowling housing at least a portion of the engine, and a midsection connected to the engine. A gear case has a first end and a second end. The first end is connected to the midsection. The second end is disposed opposite the first end. A driveshaft is disposed at least in part in the gear case and operatively connected to the engine. The driveshaft has a driveshaft axis. A propeller shaft is disposed at an angle to the driveshaft and operatively connected thereto. A propeller is mounted on the propeller shaft. A transmission chamber is defined in the gear case. The end of the driveshaft and at least a portion of the propeller shaft are disposed in the transmission chamber. An expansion chamber is disposed outside the gear case. An expansion port is defined in the gear case and fluidly communicates the transmission chamber with the expansion chamber.

In a further aspect, the expansion chamber is disposed in one of the midsection and the powerhead.

In a further aspect, the expansion chamber is defined by a container connected to at least one of the powerhead and the midsection.

In an additional aspect, at least one of the midsection and powerhead includes a cowling, the cowling has an opening and a removable panel selectively covering the opening. The container is disposed proximate the opening.

In another aspect, at least a portion of the container is at least partially transparent, and the portion of the container is visible through the opening.

In yet another aspect, the container is connected to an oil tank.

In yet another aspect, a fastener removably connects the container to the oil tank.

In an additional aspect, a container opening is defined in the container and selectively communicates with a space outside the expansion chamber and the gear case.

In a further aspect, a conduit is fluidly communicating with the container opening. The conduit includes a first end connected to the container and a second end. The first end fluidly communicates with the container opening. The conduit is sufficiently long such that the second end is selectively disposed outside the cowling.

Embodiments of the present invention each have at least one of the above-mentioned object and/or aspects, but do not necessarily have all of them. It should be understood that some aspects of the present invention that have resulted from attempting to attain the above-mentioned object may not satisfy this object and/or may satisfy other objects not specifically recited herein.

Additional and/or alternative features, aspects and advantages of embodiments of the present invention will become apparent from the following description, the accompanying drawings and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION

The present invention will be described with respect to a gear case assembly for a marine outboard engine. However, it is contemplated that the present invention could be used in gear case assemblies for other types of marine propulsion systems, such as, for example, a stern drive.

Figure 1:
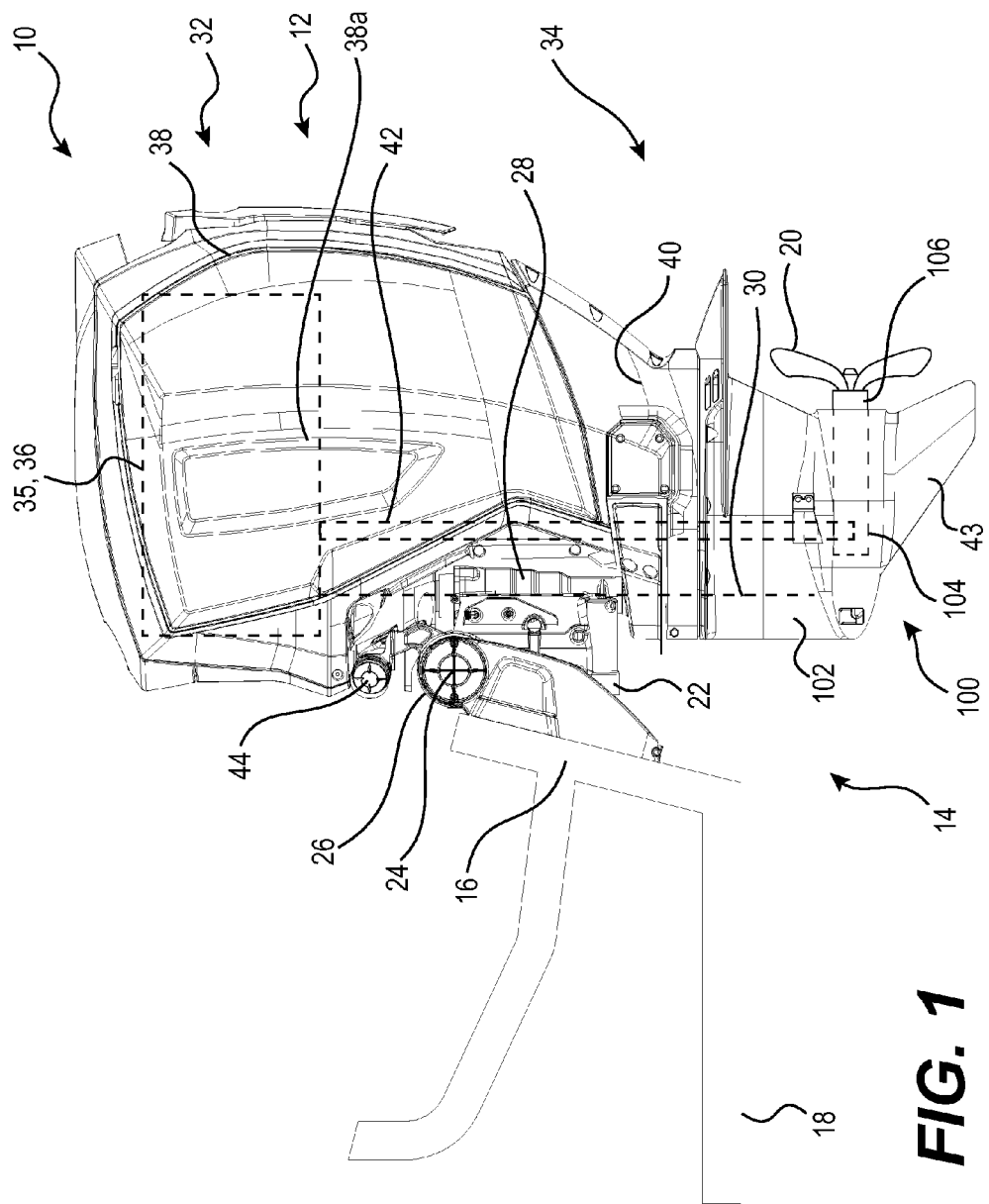
FIG. 1 is a left side elevation view of a marine outboard engine mounted to a stern of a boat.

With reference to FIG. 1, a marine outboard engine 10, shown in the upright position, includes a drive unit 12 and a bracket assembly 14. The bracket assembly 14 supports the drive unit 12 on a transom 16 of a hull 18 of an associated watercraft such that a propeller 20 is in a submerged position with the watercraft resting relative to a surface of a body of water. The drive unit 12 can be trimmed up or down relative to the hull 18 by linear actuators 22 of the bracket assembly 14 about a tilt/trim axis 24 extending generally horizontally. The drive unit 12 can also be tilted up or down relative to the hull 18 by a rotary actuator 26 of the bracket assembly 14 about the tilt/trim axis 24. The drive unit 12 can also be steered left or right relative to the hull 18 by another rotary actuator 28 of the bracket assembly 14 about a steering axis 30. The steering axis 30 extends generally perpendicularly to the tilt/trim axis 24. When the drive unit 12 is in the upright position as shown in FIG. 1, the steering axis 30 extends generally vertically.

The drive unit 12 includes an upper portion 32 and a lower portion 34. The upper portion 32 comprises a powerhead 35 which includes an engine 36 (schematically shown in dotted lines) and related components such as a fuel injector (not shown) and the like. The engine 36 is an internal combustion engine, such as a two-stroke or four-stroke engine, having cylinders extending generally horizontally when the drive unit 12 is in an upright position as shown. It is contemplated that other types of engines could be used and that the cylinders could be oriented differently. The lower portion 34 includes the gear case assembly 100, which includes a gear case 102, the propeller 20, and components located inside the gear case 102 described in detail below. A midsection 40 is connected between the powerhead 35 and the gear case 102. It is contemplated that the midsection 40 could house a portion of an exhaust system of the outboard engine 10. A cowling 38 forms at least a portion of the exterior surface of the powerhead 35 and the midsection 40, enclosing the components therein such as the engine 36 and the exhaust system. The cowling 38 comprises two side panels 38a (only the left one can be seen in FIG. 1). The side panels 38a are selectively removable so as to provide access to, inter alia, the powerhead 35.

The engine 36 is coupled to a driveshaft 42 (schematically shown in dotted lines in FIG. 1). When the drive unit 12 is in the upright position, the driveshaft 42 is oriented vertically. It is contemplated that the driveshaft 42 could be oriented differently relative to the engine 36. The driveshaft 42 is disposed in the cowling 38, passes through the midsection 40 and is coupled to a drive mechanism, which includes a transmission 104 and the propeller 20 mounted on a propeller shaft 106 as will be discussed in greater detail below. In FIG. 1, the propeller shaft 106 is perpendicular to the driveshaft 42, however it is contemplated that it could be at other angles. The driveshaft 42 and the transmission 104 transfer the power of the engine 36 to the propeller 20 mounted on the rear side of the gear case 102 of the drive unit 12. It is contemplated that the propulsion system of the outboard engine 10 could alternatively include a jet propulsion device, turbine or other known propelling device. It is further contemplated that the bladed rotor 20 could alternatively be an impeller.

To facilitate the installation of the outboard engine 10 on the watercraft, the outboard engine 10 is provided with a connection box 44. The connection box 44 is connected on top of the rotary actuator 26. As a result, the connection box 44 pivots about the tilt/trim axis 24 when the drive unit 12 is tilted, but does not pivot about the steering axis 30 when the drive unit 12 is steered. It is contemplated that the connection box 44 could be mounted elsewhere on the bracket assembly 14 or on the drive unit 12. Devices located inside the cowling 38 which need to be connected to other devices disposed externally of the outboard engine 10, such as on the deck or hull 18 of the watercraft, are provided with lines which extend inside the connection box 44. Similarly, the corresponding devices disposed externally of the outboard engine 10 are also provided with lines that extend inside the connection box 44 where they are connected with their corresponding lines from the outboard engine 10. It is contemplated that one or more lines could be connected between one or more devices located inside the cowling 38 to one or more devices located externally of the outboard engine 10 and simply pass through the connection box 44. It is contemplated that the connection box 44 could be omitted.

Other known components of an engine assembly are included within the cowling 38, such as a starter motor, an alternator and the exhaust system. As it is believed that these components would be readily recognized by one of ordinary skill in the art, further explanation and description of these components will not be provided herein.

The gear case assembly 100 will now be described in more detail with reference to FIGS. 2 to 5.

The gear case assembly 100 is shown in the figures in its upright position (i.e. as shown in FIG. 1). The gear case assembly 100 includes the gear case 102 housing portions of the driveshaft 42, the propeller shaft 106, the transmission 104 and an electric transmission actuator assembly 108. The gear case 102 has a top end 102a along which the gear case 102 is connected to the midsection 40. The top end 102a of the gear case 102 has a number of apertures used to receive the fasteners (not shown) used to connect the gear case 102 to the bottom of the midsection 40 and/or the components housed therein. The gear case 102 has a bottom end 102b opposite the top end 102a from which a skeg 43 extends.

The gear case 102 includes water passages 132 to enable cooling of the various components housed within the gear case 102. The gear case 102 defines an upper water inlet 116 in the middle portion, and a lower water inlet 118 near the bottom end. The gear case 102 defines water outlets 114 at the top end 102a of the gear case 102. The water inlets 116, 118 fluidly communicate the exterior of the gear case 102 with water passages 132 defined in the gear case 102 to provide cooling water throughout the drive unit 12 to cool components therein, such as the engine 36, an electronic management unit (not shown) and exhaust passage 134. The passages 132 are connected to other passages (not shown) in the remainder of the drive unit 12 to cool these and other components of the outboard engine 10. After cooling the components, water leaves the drive unit 12 via the water outlets 114 and other water outlets (not shown). The water inlets 116, 118 and the water outlet 114 are covered by screens (not shown) to prevent entry of debris into the water passages 132.

The gear case 102 further includes various lubricant passages, such as a lubricant return passage 120, to enable lubricant to flow to the various components housed within the gear case 102. In the present embodiment, the lubricant is marine grade oil, but it is contemplated that other types of lubricants could be used.

Figure 2:
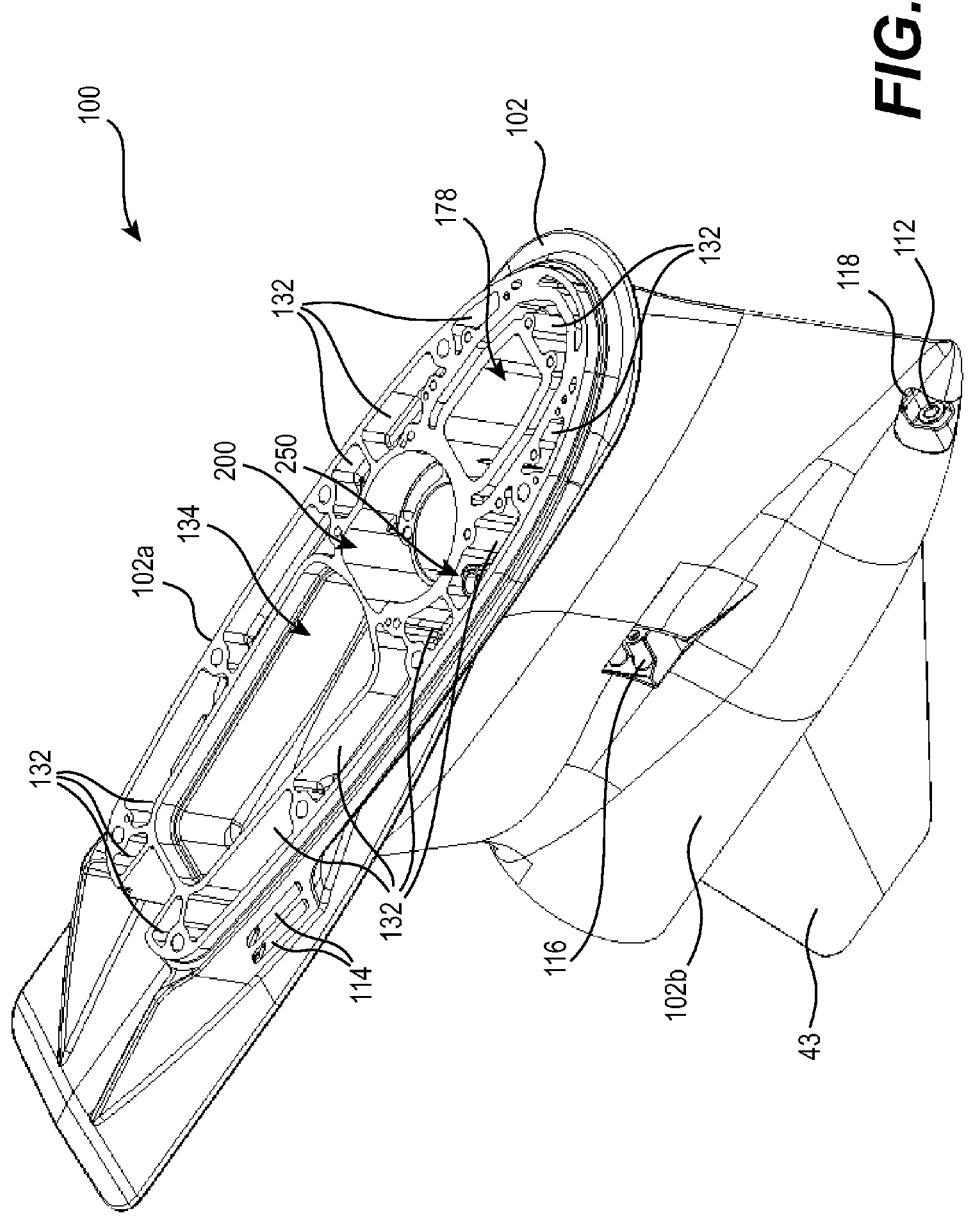
FIG. 2 is a perspective view taken from a top, front, right side of a gear case of a gear case assembly of the outboard engine of FIG. 1.
Figure 3:
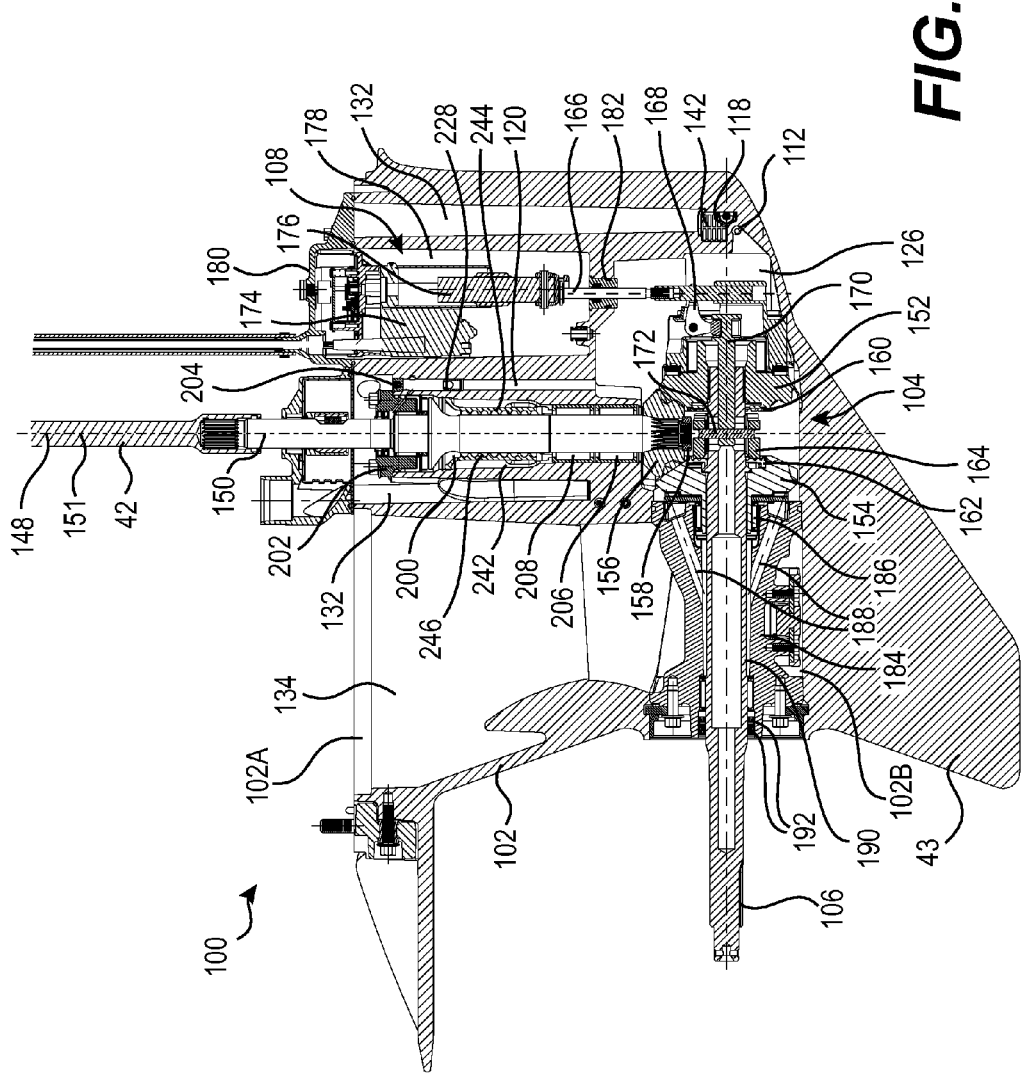
FIG. 3 is a vertical cross-sectional view of the gear case assembly of the outboard engine of FIG. 1 taken along a vertical plane passing through the lateral center of the gear case.
Figure 5:
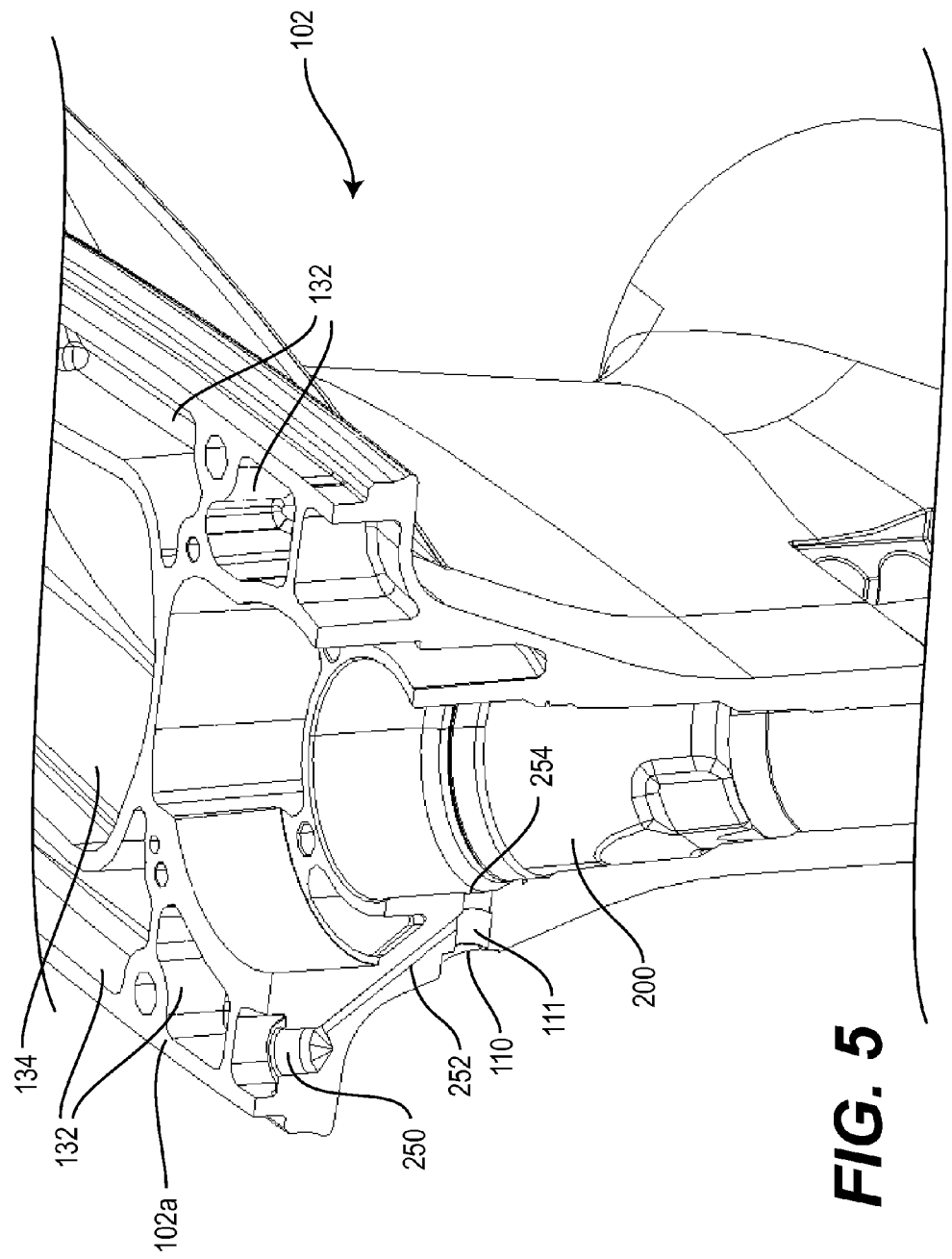
FIG. 5 is a cut-away perspective view taken from top, front and left side of the gear case of FIG. 2 showing a portion of the driveshaft passage and an expansion port connected thereto via an expansion passage.

The gear case 102 has an upper lubricant filling port 110 (FIG. 5) and a lower lubricant filling port 112 (FIGS. 2 and 3). The lower lubricant filling port 112 is disposed near the bottom end 102b of the gear case 102, while the upper lubricant filling port 110 is near the top end 102a of the gear case 102. As best seen in FIG. 3, the lower lubricant filling port 112 is located adjacent the lower water inlets 118. The upper lubricant filling port 110 communicates the exterior of the gear case 102 with a driveshaft passage 200 formed by the gear case 102 as can be seen in FIG. 5. The lower lubricant filling port 112 communicates the exterior of the gear case 102 with the transmission chamber 126 of the gear case 102. The outer portion of the upper and lower lubricant filling ports 110, 112 is threaded. The lubricant ports 110, 112 are closed by a threaded plug (not shown) fastened to their outer threaded outer portions. The threaded plugs are screw and magnet assemblies, but it is contemplated that other types of plugs could be used.

Although both lubricant filling ports 110, 112 and the water inlets 116, 118 open on a right side of the gear case 102, it is contemplated that these ports 110, 112, 116, 118 could be open on the left side of the gear case 102.

The driveshaft 42 is made of an upper portion 148 connected to the engine 36, a lower portion 150 connected to the upper portion 148 via splines, and defines a driveshaft axis 151. It is contemplated that the driveshaft 42 could be made of a single portion or of more than two portions. The lower portion 150 of the driveshaft 42 is mounted vertically near a longitudinal center of the gear case 102. The propeller shaft 106 is mounted in an orientation perpendicular to the driveshaft 42 and is selectively connected to the transmission 104 which is also coupled to the bottom of the lower portion 150 of the driveshaft 42. A transmission actuator assembly 108 is operatively connected to the propeller shaft 106 to selectively connect the propeller shaft 106 with the transmission 104 as will be explained below. As mentioned above, the propeller 20 is connected to the rear end of the propeller shaft 106.

The gear case 102 defines a driveshaft passage 200 housing a majority of the lower portion 150 of the driveshaft 42, a transmission chamber 126 housing a portion of the propeller shaft 106 and the transmission 104, and an actuator chamber 178 housing the transmission actuator assembly 108. The transmission actuator chamber 178 is disposed in the forward portion of the gear case 102 with the driveshaft passage 200 disposed rearward thereof. The transmission chamber 126 is disposed in the lower portion of the gear case 102 below the driveshaft passage 200 and the actuator chamber 178. The lubricant return passage 120 fluidly communicates the driveshaft passage 200 with the transmission chamber 126. The lubricant return passage 120 is disposed between the driveshaft passage 200 and the actuator chamber 178. An exhaust passage 134 in the rear portion of the gear case 102 permits exhaust gases from the midsection 40 and the engine 36 to flow down into the gear case 102 and out from a rear end thereof.

Two oppositely facing bevel gears 152, 154 of the transmission 104 are engaged to opposite sides of a complementary bevel gear 156, also referred to as a pinion. The bevel gear 156 is connected via splines to the bottom of the lower portion 150 of the driveshaft 42. The bevel gear 156 is held in place on the driveshaft 42 by a nut 158 threaded on the lower end of the lower portion 150 of the driveshaft 42. The bevel gears 152, 154 rotate with the driveshaft 42 but in opposite directions. Each bevel gear 152, 154 of the transmission 104 has a toothed plate 160, 162 respectively press-fit therein. The two plates 160, 162 face each other. The propeller shaft 106 is in splined connection with a sleeve 164 having a pair of outwardly facing toothed faces. The toothed faces of the sleeve 164 are selectively engaged with the toothed plates 160, 162 of one or the other of the bevel gears 152, 154 by translation of the sleeve 164 along the propeller shaft 106. Engagement of the sleeve 164 with a toothed plate 160 or 162 of the bevel gear 152 or 154, respectively, results in rotation of the propeller shaft 106 along with that bevel gear 152 or 154, thereby resulting in forward or reverse rotation of the propeller shaft 106. The sleeve 164 can also be located so as to be disengaged from both bevel gears 152, 154. This corresponds to a neutral operating condition of the transmission 104 where no torque is transferred from the engine 36 to the propeller shaft 106. The above components of the transmission 104, including the lower end of the driveshaft 42, are disposed in the transmission chamber 126.

A shift rod 166 is selectively actuated along its axis to selectively actuate the sleeve 164. The vertically extending shift rod 166 is connected to one arm of an L-shaped rocker 168. The other arm of the L-shaped rocker 168 is connected to a shaft 170. The shaft 170 is disposed within a bore defined along the forward end of the propeller shaft 106. The shift rod 166, the rocker 168, the shaft 170, the pin 172 and the forward end of the propeller shaft 106 are also disposed in the transmission chamber 126. The shaft 170 is connected to the sleeve 164 via a pin 172 extending through the rear end of the shaft 170, a slot in the propeller shaft 106 and holes in the sleeve 164. When the shift rod 166 is pulled upwards, the rocker 168 is pulled up, thereby pulling the shaft 170 forward (towards the right in FIG. 3), which in turn pulls the sleeve 164 forward, thereby engaging the plate 160 of the bevel gear 152. When the shift rod 166 is pushed downwards, the rocker 168 is pushed down, thereby pushing the shaft 170 rearward (towards the left in FIG. 3), which in turn pushes the sleeve 164 rearward, thereby engaging the plate 162 of the bevel gear 154. Moving the shift rod 166 to a position intermediate these up and down positions moves the sleeve 164, via the shaft 170, to a neutral position between the plates 160 162 of the bevel gears 152, 154 where both plates 160, 162 of the bevel gears 152, 154 are not engaged by the sleeve 164.

The electric transmission actuator assembly 108 is used to actuate the vertically extending shift rod 166. The electric transmission actuator assembly 108 has an electric motor 174 connected to a linear actuator 176 extending vertically downwards. The actuator assembly 108 is located in the actuator chamber 178 formed by the gear case 102 and closed by a cover 180. As can be seen in FIG. 2, the actuator chamber 178 is disposed forward to the lubricant passage 120 and above the transmission chamber 126. The actuator chamber 178 is sealed so as to prevent the intrusion of water and lubricant therein. The actuation of the actuator 176 is controlled by providing appropriate logic signals to the electric motor 174. The lower end of the actuator 176 engages an upper end of the shift rod 166. The actuator 176 actuates the sleeve 164 by actuating the shift rod 166 vertically along the central axis of the shift rod 166. A seal 182 is provided around the shift rod 166 where it passes through the lower wall of the chamber 178 to prevent the entry of lubricant inside the actuator chamber 178. It is contemplated that the actuator 176 could be a rotary actuator. Other configurations of the transmission 104 with different shifting mechanisms are also contemplated.

The propeller shaft 106 is rotationally supported inside a propeller shaft housing 184 by a pair of needle bearings 186. Passages 188 formed in the propeller shaft housing 184 fluidly communicate the transmission chamber 126 with the space 190 defined between the propeller shaft housing 184 and the propeller shaft 106 thus permitting lubricant to flow to the needle bearings 186. Seals 192 disposed between the propeller shaft 106 and the propeller shaft housing 184 rearward of the rear needle bearing 186 prevent lubricant from leaking in the water in which the outboard engine 10 is being operated.

The lower portion 150 of the driveshaft 42 extends through the driveshaft passage 200. The lower end of the driveshaft passage 200 communicates with the transmission chamber 126. The upper end of the driveshaft passage 200 is located below the top of the gear case 102. To separate the driveshaft passage 200 from the water passage 132, a cap 202 is fastened to the upper end of the wall defining the driveshaft passage 200. A pair of seals (not indicated) disposed between the lower portion of the driveshaft 42 and the inner wall of the cap 202 at a top thereof prevent water in the water passage from entering the driveshaft passage 200 and lubricant in the driveshaft passage 200 from entering the water passage 132. As can also be seen in these figures, the upper end of the lubricant return passage 120 is also closed by a cap 204. The diameter of the driveshaft passage 200 is larger than the diameter of the lubricant return passage 120. The driveshaft 42 is rotationally supported in the driveshaft passages 200 by needle bearings 206, 208, and others not seen in FIG. 3. The bearings 206 and 208 are disposed between the lower portion 150 of the driveshaft 42 and the lower portion of the wall defining the driveshaft passage 200. The driveshaft passage 200 communicates fluidly with the lubricant return passage 120 via a connection passage (not indicated) defined in the wall of the gear case 102 located between the lubricant return passage 120 and the driveshaft passage 200. A check valve 228 is disposed in an upper portion of the lubricant return passage 120 at a position below its connection with the driveshaft passage 200. The check valve 228 permits lubricant flow in a downward direction toward the transmission chamber 126. The check valve 228 prevents lubricant from flowing through it in a direction upward and away from the transmission chamber. In the present embodiment, the check valve 228 is a ball valve, but other types of check valves are contemplated.

Figure 4:
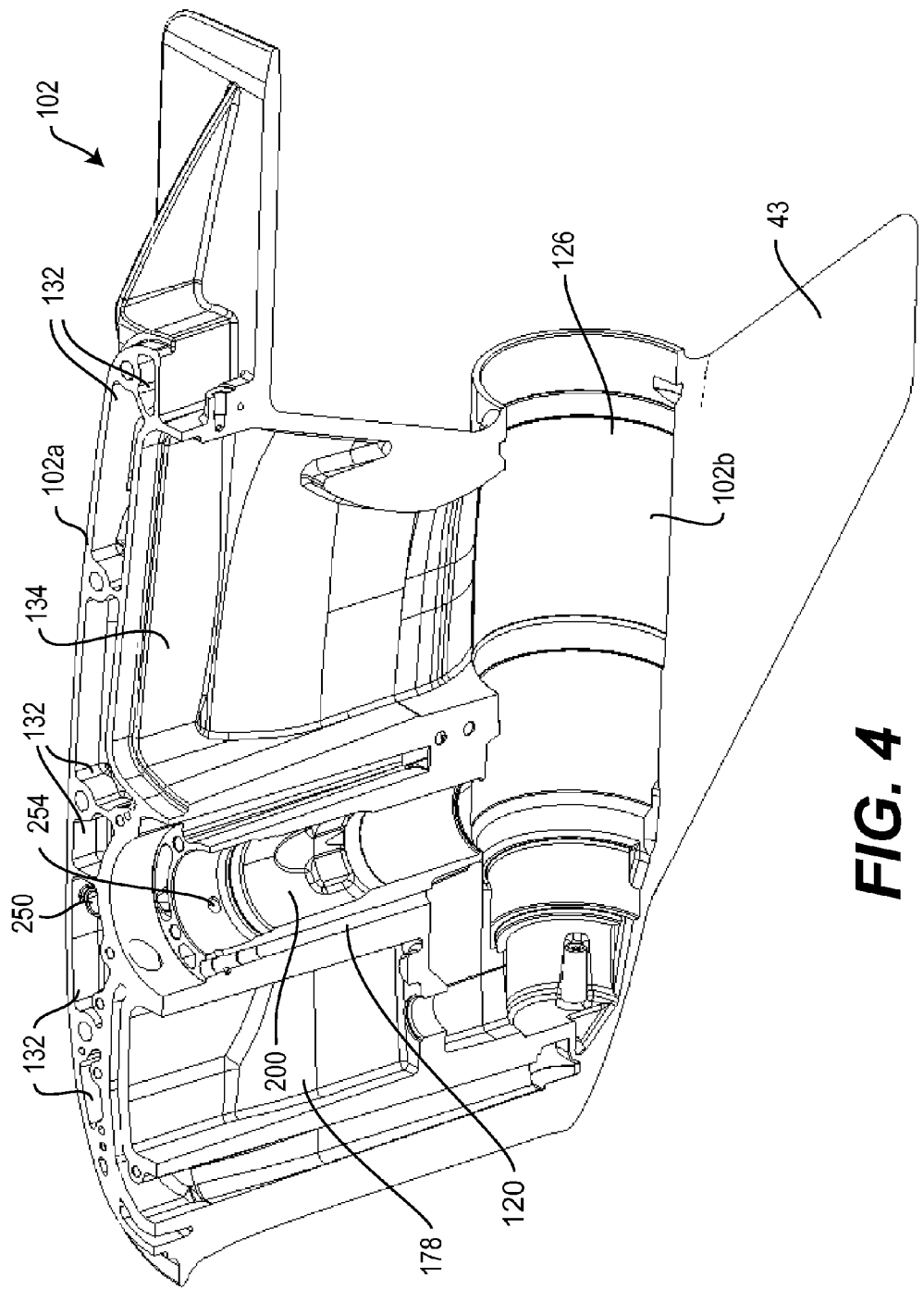
FIG. 4 is a cut-away perspective view, taken from a top, left side of the gear case of FIG. 2.

With reference to FIGS. 2, 4 and 5, an expansion port 250 is defined in the top end 102a of the gear case 102. An opening 254 is defined in the wall of the driveshaft passage 200. The port 250 fluidly communicates with the opening 254 of the driveshaft passage 200 via a connection passage 252. The upper fill port 110 communicates with the opening 254 via a fill passage 111. The connection passage 252 connects to the fill passage 111, and thereby to the driveshaft passage 200 via the opening 252. It is contemplated that the connection passage 252 could not join with the fill passage 111 but could instead connect directly to the driveshaft passage 200 at a different location from the fill passage 111. It is also contemplated that the connection passage 252 could connect to another location in the driveshaft passage 200 than as shown in the illustrated embodiment. It is contemplated that the connection passage 252 could directly fluidly communicate the expansion port 250 with the transmission chamber 126, or other parts of the gear case 102 fluidly connected to the transmission chamber 126, such as the lubricant return passage 120.

The gear case 102 is provided with a pump that is driven by the driveshaft 42 to circulate the lubricant inside the gear case 102 during operation. In the present embodiment, the pump is an Archimedes screw 242. It is contemplated that other types of pumps could be used. For example, one or both of the bevel gears 152, 154 could be adapted to operate as pumps in addition to transferring torque from the driveshaft 42 to the propeller shaft 106. The Archimedes screw 242 is formed by a portion of the lower portion 150 of the driveshaft 42 and a pump housing 244. The pump housing 244 is disposed inside the driveshaft passage 200 around the lower portion 150 of the driveshaft 42. As can be seen, the pump housing is disposed above the bearings 206, 208. The pump housing 244 defines an internal thread 246. As the driveshaft 42 rotates, lubricant is caused to move up inside the thread 246, thus pumping lubricant located below the Archimedes screw 242 to a location above the Archimedes screw 242. In an alternative embodiment, the thread 246 is omitted and an external thread is defined on the lower portion 150 of the driveshaft 42.

During operation of the outboard engine 10, lubricant is pumped, by the Archimedes screw 242, from the transmission chamber 126, up around the bevel gear 156, into the driveshaft passage 200, then through the bearings 206, 208 and up the Archimedes screw 242. Some of the lubricant in the upper portion of the driveshaft passage 200 flows into the lubricant return passage 120 and down through the check valve 228 and the rest of the lubricant return passage 120 to return to the transmission chamber 126.

Figure 6:
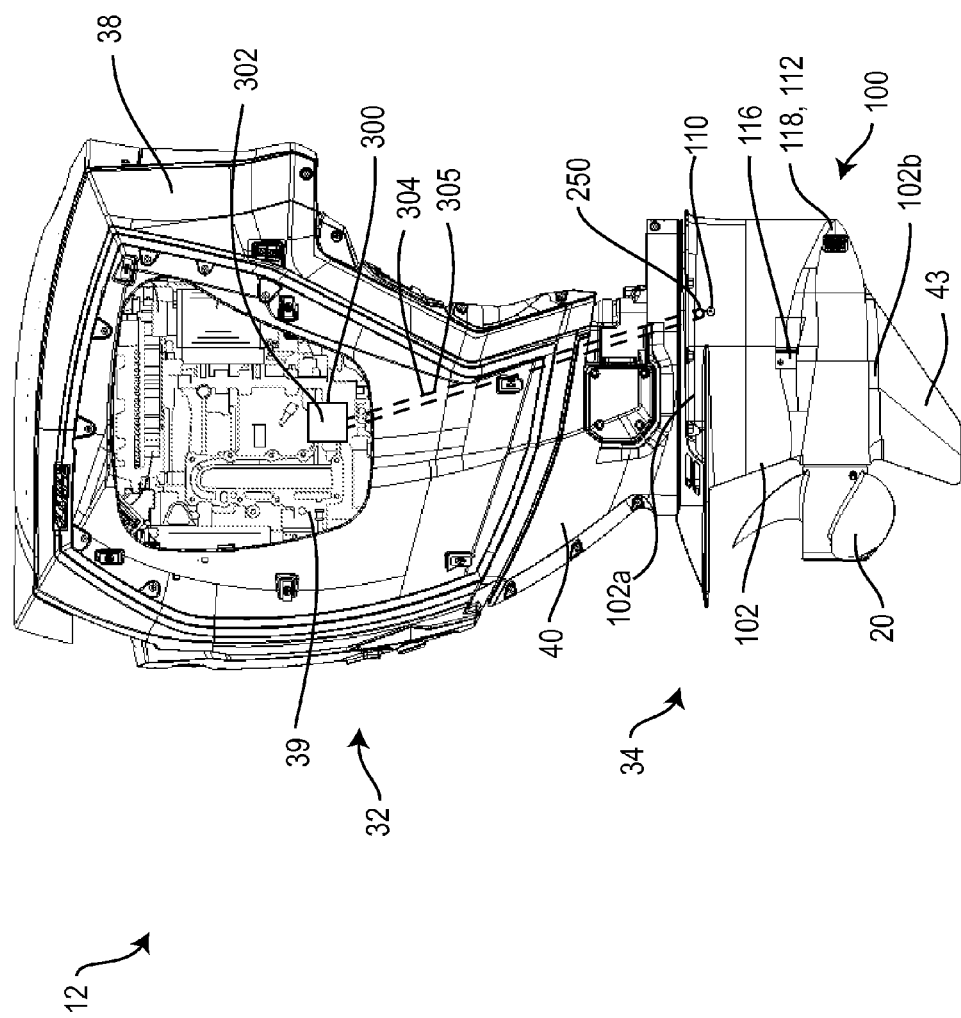
FIG. 6 is a right side elevation view of the outboard engine of FIG. 1 with a right side panel of a cowling removed to show a container.
Figure 7:
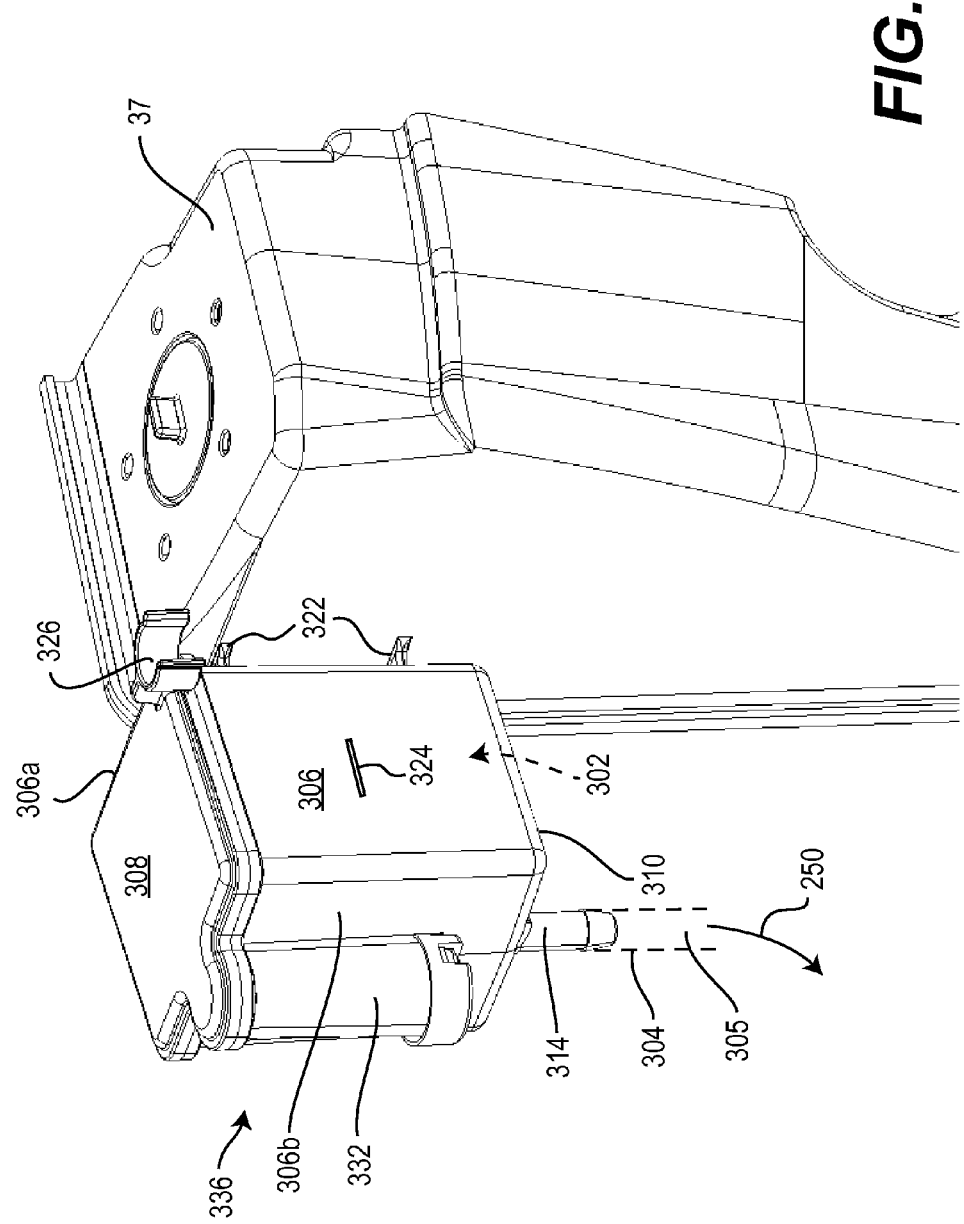
FIG. 7 is a perspective view taken from a rear, right side of the container of FIG. 6 mounted to an engine oil reservoir of the outboard engine of FIG. 1.
Figure 8:
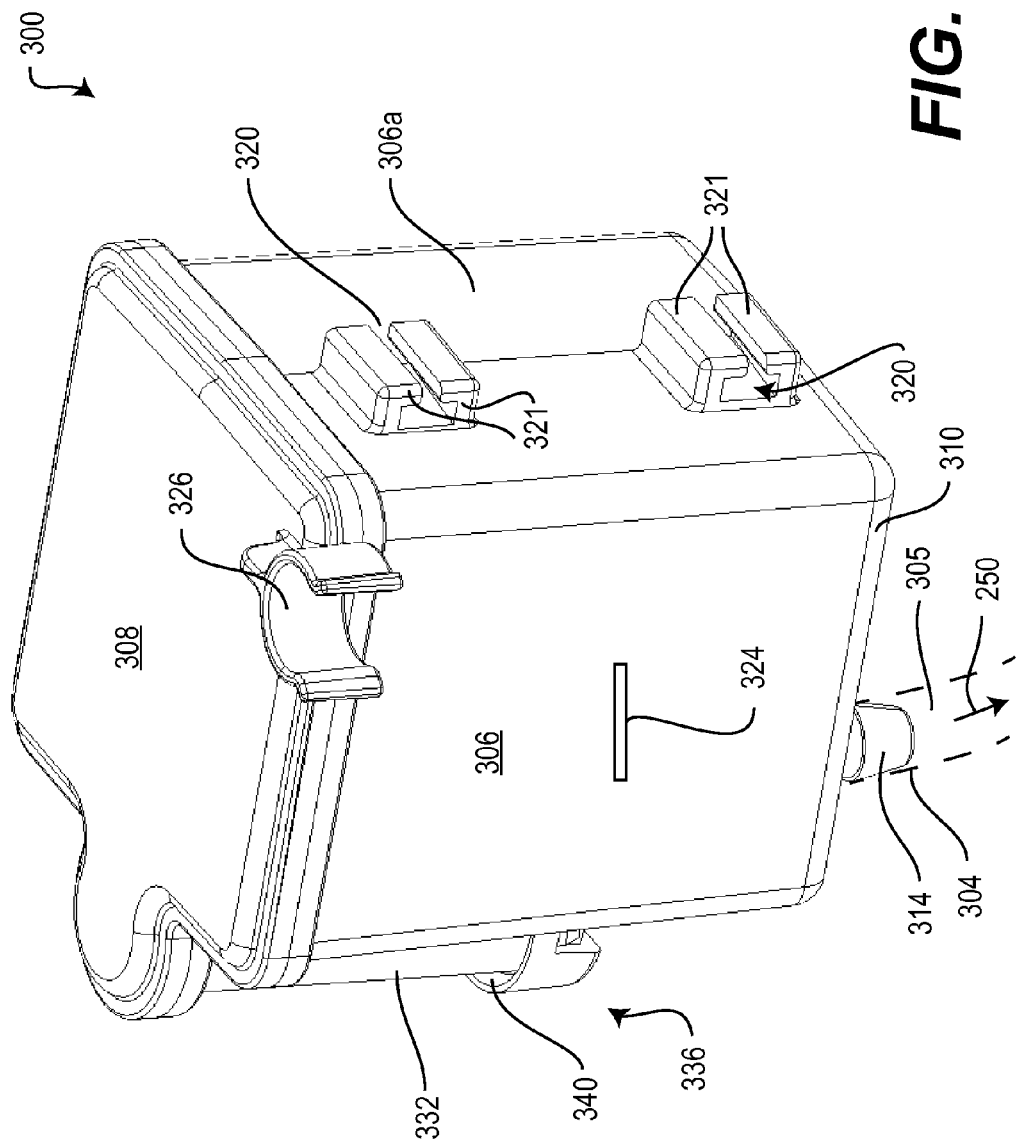
FIG. 8 is a perspective view taken from a front, right side of the container of FIG. 7 shown in isolation.

With reference to FIG. 6, the expansion port 250 is connected to a container 300 (shown schematically in FIG. 6) disposed inside the cowling 38 in the upper portion 32 of the drive unit 12 by a conduit 304 (shown schematically in FIG. 6). The container 300 defines an expansion chamber 302 fluidly communicating with the expansion port 250. The conduit 304, in the form of a flexible tube 304, defines a expansion passage 305 which fluidly communicates the expansion port 250 with the expansion chamber 302. It is contemplated that the container 300 could be disposed in another location outside of the gear case 102 than as shown in the illustrated embodiment.

The expansion chamber 302 formed by the container 300 therefore provides an additional volume that is in fluid communication with the gear case 102, and more specifically the transmission chamber 126 and the driveshaft passage 200. In one embodiment, the volume of the expansion chamber 302 and expansion passage 305 is selected to enclose sufficient air to compensate for any temperature variations in the lubricant within the gear case 102, thereby enabling the lubricated chambers (such as the transmission chamber 126 and driveshaft passage 200) to be fully filled with lubricant.

Alternatively, the expansion chamber 302 can be partially filled with lubricant. When the lubricant being pumped in through the lower fill port 112 rises up the driveshaft passage 200 and reaches the opening 254, the lubricant flows through the connection passage 252 and the expansion port 250 into the expansion passage 305, and finally into the expansion chamber 302.

With reference to FIGS. 7 to 10, the container 300 will now be described in more detail. The container 300 is a molded plastic container attached to an engine oil reservoir 37, or oil tank 37, disposed inside the cowling 38. It is contemplated that the container 300 could be attached to a structure other than the engine oil reservoir 37. It is contemplated that the container 300 could be attached elsewhere on the powerhead 35 or in the midsection 40. The container 300 has four side walls 306, including a front side wall 306a, and a rear side wall 306b. The container 300 has a top wall 308 and a bottom wall 310. The container 300 is attached to the reservoir 37 by the front side wall 306a. The front side wall 360a has T-shaped slots 320, each defined by a pair of opposing tabs 321. The slots 320 receive complementary T-shaped tabs 322 on a rear-facing wall of the reservoir 37. The rear side wall 306b has attached thereon a vent tube 332 which will be discussed below in more detail. The top wall 308 forms a removable cover that is press-fit onto the side walls 306. A circular clamp 326 connected to the front right corner of the top wall 308 is used to secure sensor wires extending through the cowling 38. It is contemplated that the clamp 326 could be omitted. The bottom wall 310 has an opening 312. A nipple 314 is disposed around the opening 312. One end of the conduit 304 fits around the nipple 314 and the other end of the conduit 304 is connected to the expansion port 250. The expansion passage 305 thereby fluidly communicates the expansion chamber 302 with the driveshaft passage 200 and the transmission chamber 126 of the gear case 102.

The expansion chamber 302 has a volume of approximately 225 cubic centimeters. The total volume of the expansion chamber 302 and the expansion passage 305 defined by the conduit 304 is at least as large as the volume of the transmission chamber 126 occupied by the transmission actuator chamber 178. The container 300 of the illustrated embodiment is generally cubic in shape but it is contemplated that the container could be shaped differently than as shown. The container 300 could be in the form of bellows or a bladder. It is contemplated that the container 300 could be flexible so that the volume of the expansion chamber is adjustable. It is contemplated that the container 300 and the conduit 304 could be formed integrally. It is also contemplated that the conduit 304 could be the container 300, and that the expansion passage 305 could be the expansion chamber 302.

The container 300 is transparent so that the lubricant in the expansion chamber 302 is visible from outside the container 300. A fill line 324 is marked on the right side wall 306 of the container 300 in order to provide a visual indication of the level to which the lubricant should be filled. It is contemplated that the container 300 could be made of semi-transparent material. It is also contemplated that only a portion of the container 300, for example, a central vertically extending portion, could be transparent or semi-transparent. The fill-line 324 could be marked on or in proximity to the transparent or semi-transparent portion of the container 300. As best seen in FIG. 6, the container 300 is mounted to the powerhead 35 such that it is visible to a user through an opening 39 when the panel 38a is removed. As such, the user filling the gear case 102 with lubricant will get a visual confirmation (i.e. the lubricant reaching the fill line 324) when sufficient lubricant has been pumped therein. It is contemplated that the container 300 could be mounted at another position in the powerhead 35 or midsection 40 that is accessible to a user. It will be appreciated the container 300 could be mounted in a similarly accessible position on an outboard engine having a differently structured cowling 38.

Figure 9:
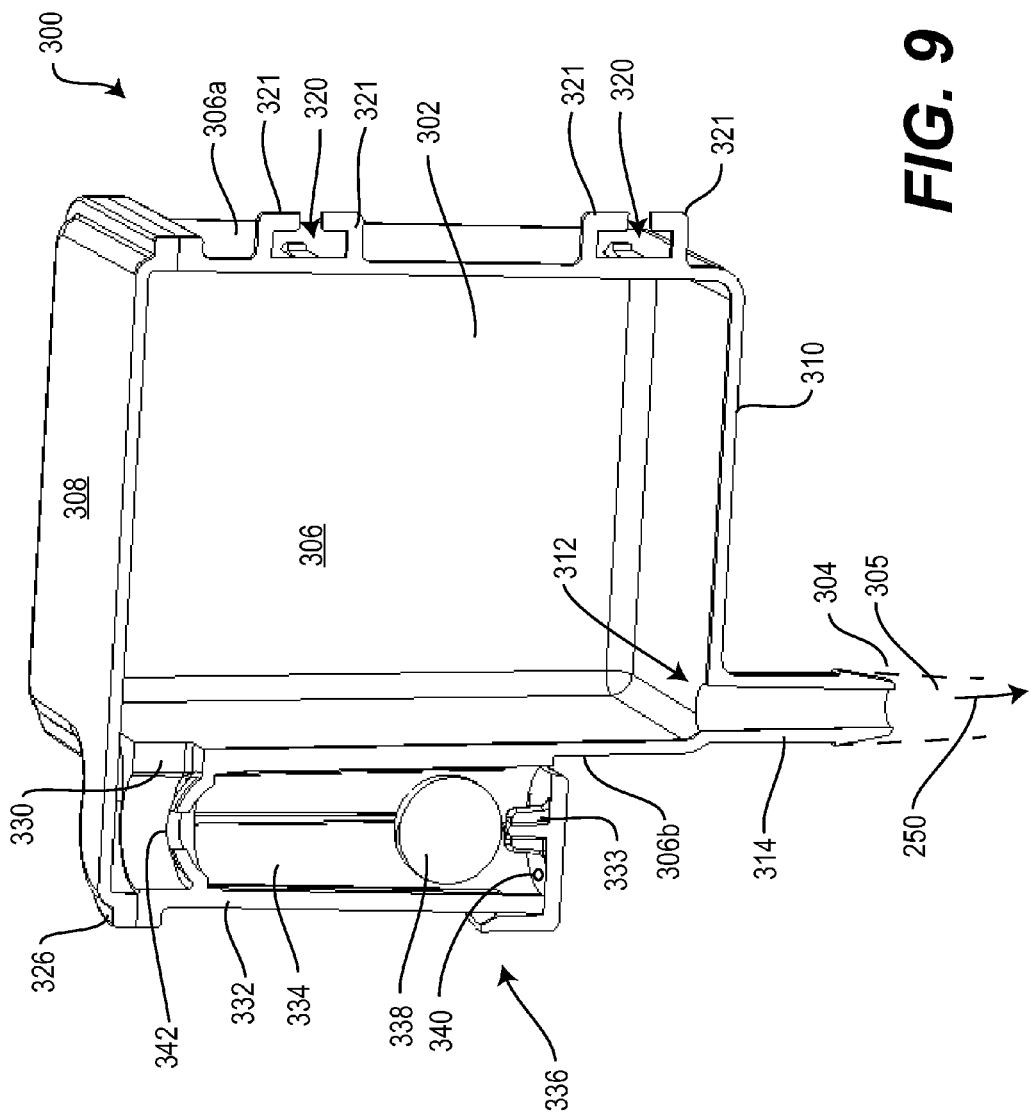
FIG. 9 is a vertical cross-sectional view of the container of FIG. 8 taken along a vertical plane passing longitudinally through a lateral center of the container of FIG. 8.

As best seen in FIG. 9, the container 300 has a vent port 330 defined at the top corner of the rear side wall 306b. Air inside the expansion chamber 302 can flow out of the container 300 through the vent port 330. The vented container 300 is vented in order to facilitate pumping of the lubricant into the gear case 102, the conduit 304 and the container 300 prior to operating the engine 10, as well as to facilitate draining of the lubricant therefrom. During operation, the lubricant heats up and expands. The vented container 300 allows expansion of the lubricant in the gear case 102, the conduit 304 and the expansion chamber 302 by pushing a volume of air equal to the increased volume of lubricant out of the vent port 330.

A vent tube 332 is connected to the container 300 along its rear side wall 360b. The vent tube 332 defines a vent passage 334 and includes a check valve 336. The check valve is in the form of a ball valve 336 with a ball 338 disposed inside the vent passage 334. A first upper opening 342 of the vent passage 334 fluidly communicates with the vent port 330 of the container 300. The opening 342 is coaxial with the cylindrical vent passage 334. The diameter of the vent passage 334 is larger than the upper opening 342. At the lower end opposite the opening 342, the vent passage is defined by a lower end wall of the vent tube 332. A protrusion 333 at the center of the lower end wall, disposed coaxially with the vent passage 334 and the upper opening 342, extends inwards into the vent passage 334. An opening 340 is defined in the end wall offset from the central protrusion 333. It is contemplated that the vent tube 332 could have more than one opening 340 offset from the center of the vent passage 334. The ball 338 normally rests on the central protrusion 333 of the vent tube 332. The opening 340 thus remains open and unblocked by the ball 338. The vent passage 334 communicates with the exterior of the container 300 via the opening 340. The diameter of the vent passage 332 is greater than the diameter of the ball 338 and air can thus flow between the opening 340 and opening 342 around the ball 338. Air therefore flows from the expansion chamber 302 to the exterior of the container 300 through the vent port 330, the upper opening 342, the vent passage 334 and the lower opening 340. Similarly, can air can flow in the reverse direction from the outside of the container 300 to the expansion chamber 302.

In the event that water outside the container 300 enters the vent passage 334 through the opening 340, the water flowing upward from the lower end of the event tube 332 would push the ball 338 upwards until the ball 338 reaches the upper opening 342. As a result, the upper opening 342 is blocked by the ball 338, thereby preventing the water in the vent passage 334 from entering into the expansion chamber 302.

As the vent port 330 is defined in an upper end of the rear side wall 360b of the container 300, lubricant inside the expansion chamber 302 would only flow out of the vent port 330 if lubricant level was high enough to reach the vent port 330 at the upper end of the expansion chamber 302. During normal operation of the outboard engine 10, if the drive unit 12 is tilted and/or trimmed about the tilt/trim axis 24, container 300 tilts such that the rear wall 360b moves upwards, and the vent port 330 is disposed above the lubricant in the expansion chamber 302.

In the illustrated embodiment, the space (including the transmission chamber 126, the driveshaft passage 200 and other spaces fluidly connected thereto) enclosed by the gear case 102 is in fluid communication with the vent port 330, and thus remains at atmospheric pressure during operation. It is however also contemplated that the vent port 330 could be omitted. In this case, the container 300, and thus the gear case 102, would not be vented and the expansion of the lubricant would be accommodated by compression of air in the expansion chamber 302 above the lubricant. Whether the gear case 102 is vented to atmospheric pressure or not, the extra space provided by the expansion chamber 302 outside the gear case 102 therefore accommodates expansion of the lubricant within the gear case 102. If the gear case 102 was simply vented without being connected to the expansion chamber 302, the lubricant would spill out of the gear case 102 during operation. If the gear case 102 was not vented and also not connected to the extension chamber 302 outside the gear case 102, the volume of the space enclosed by the gear case 102 and immersed in lubricant would be too small to contain a sufficient amount of lubricant for lubrication of the relevant components as well as a sufficient amount of air that could be compressed to accommodate lubricant expansion.

Figure 10:
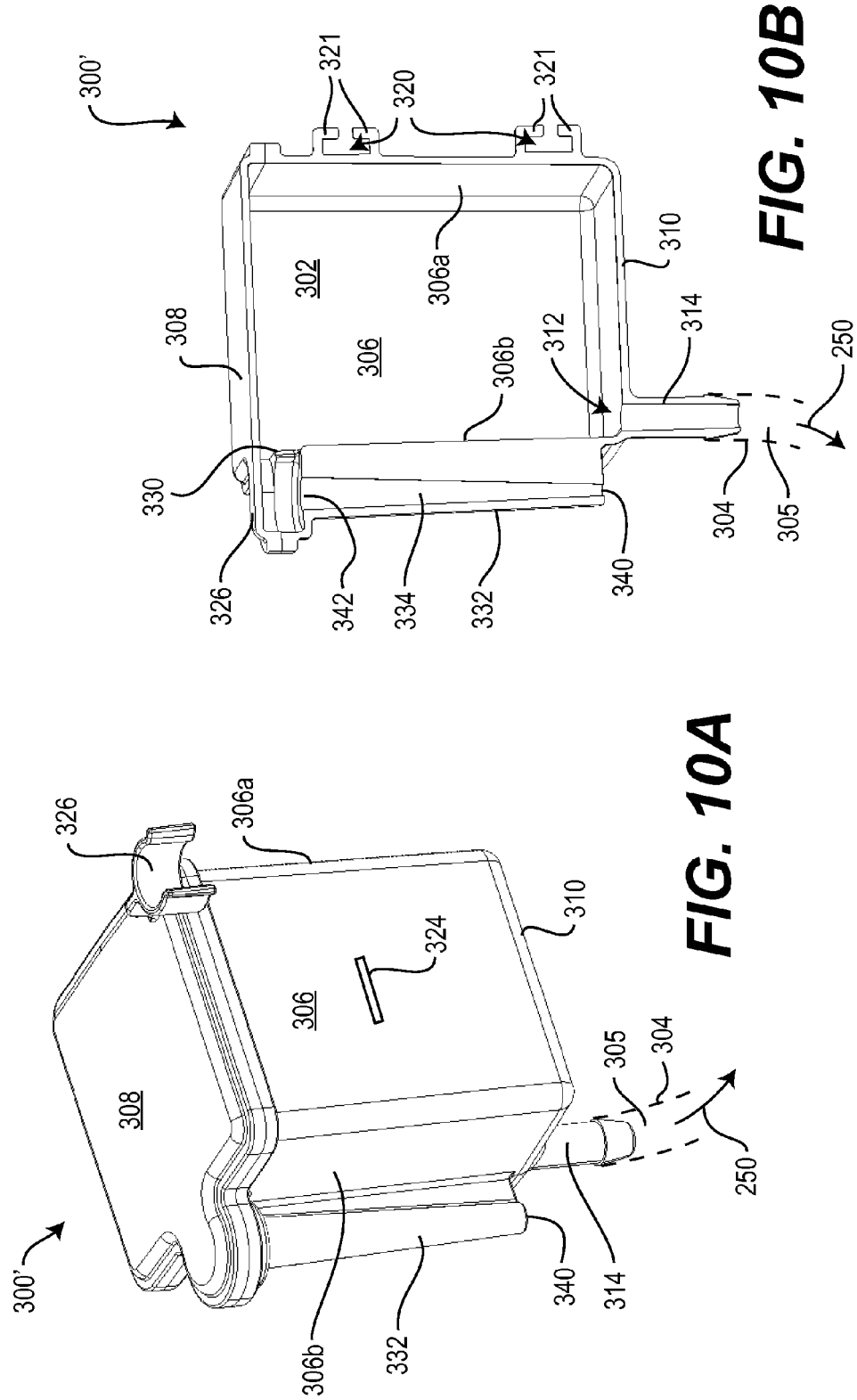
FIG. 10A is a perspective view taken from a rear, right side of another embodiment of a container.
FIG. 10B is a vertical cross-sectional view of the container of FIG. 10A, taken along a vertical plane passing longitudinally through a lateral center thereof.
Figure 11:
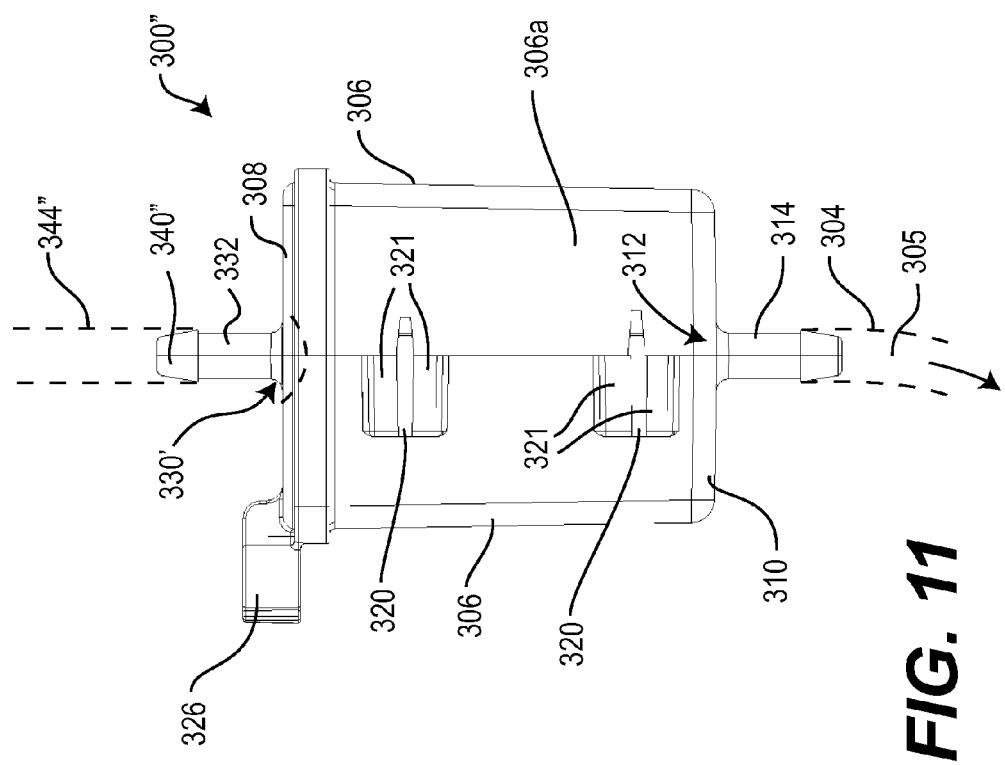
FIG. 11 is a front elevation view of yet another embodiment of a container.
Figure 12:
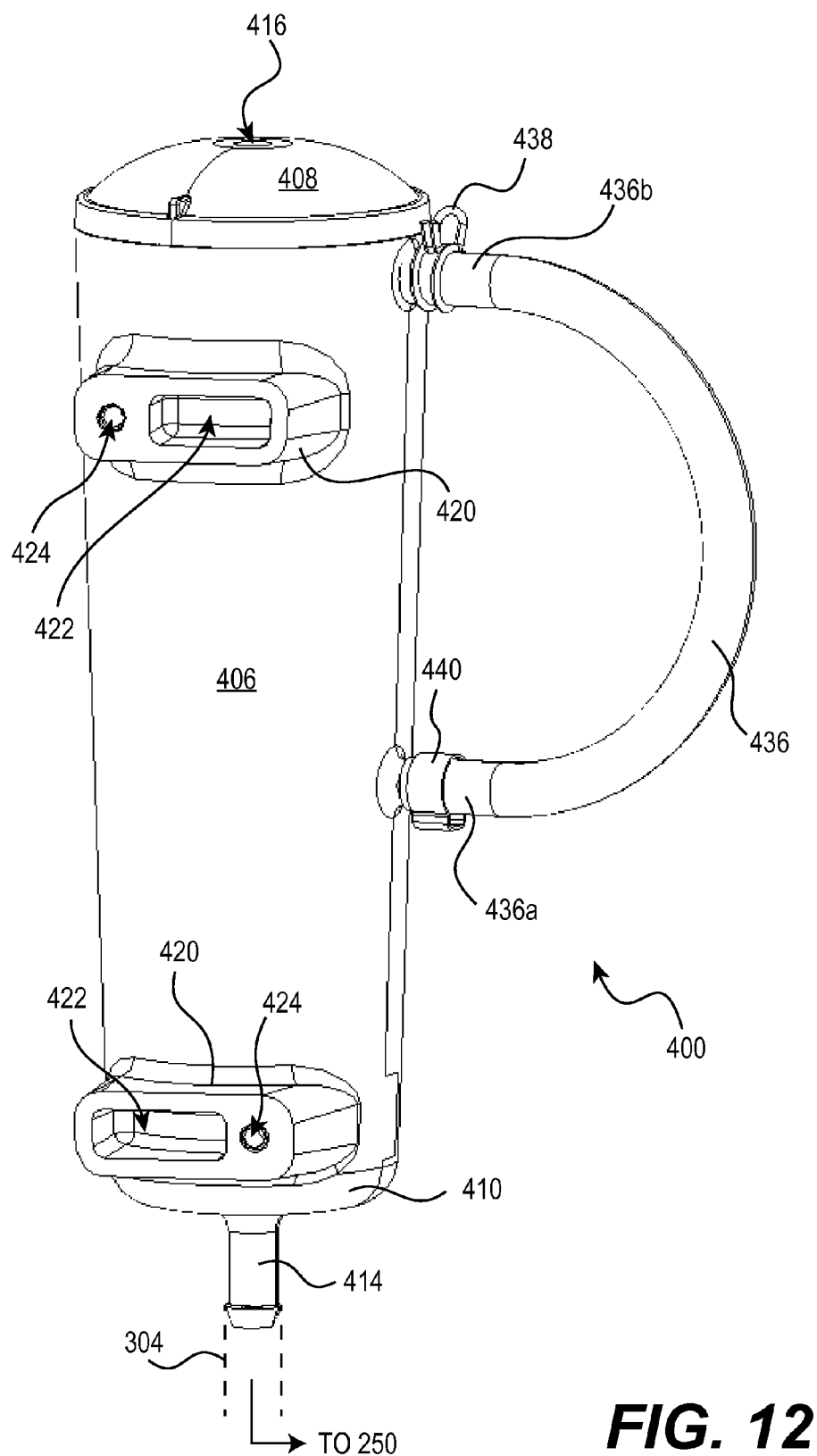
FIG. 12 is a perspective view, taken from a front and right side, of another embodiment of a container.
Figure 13:
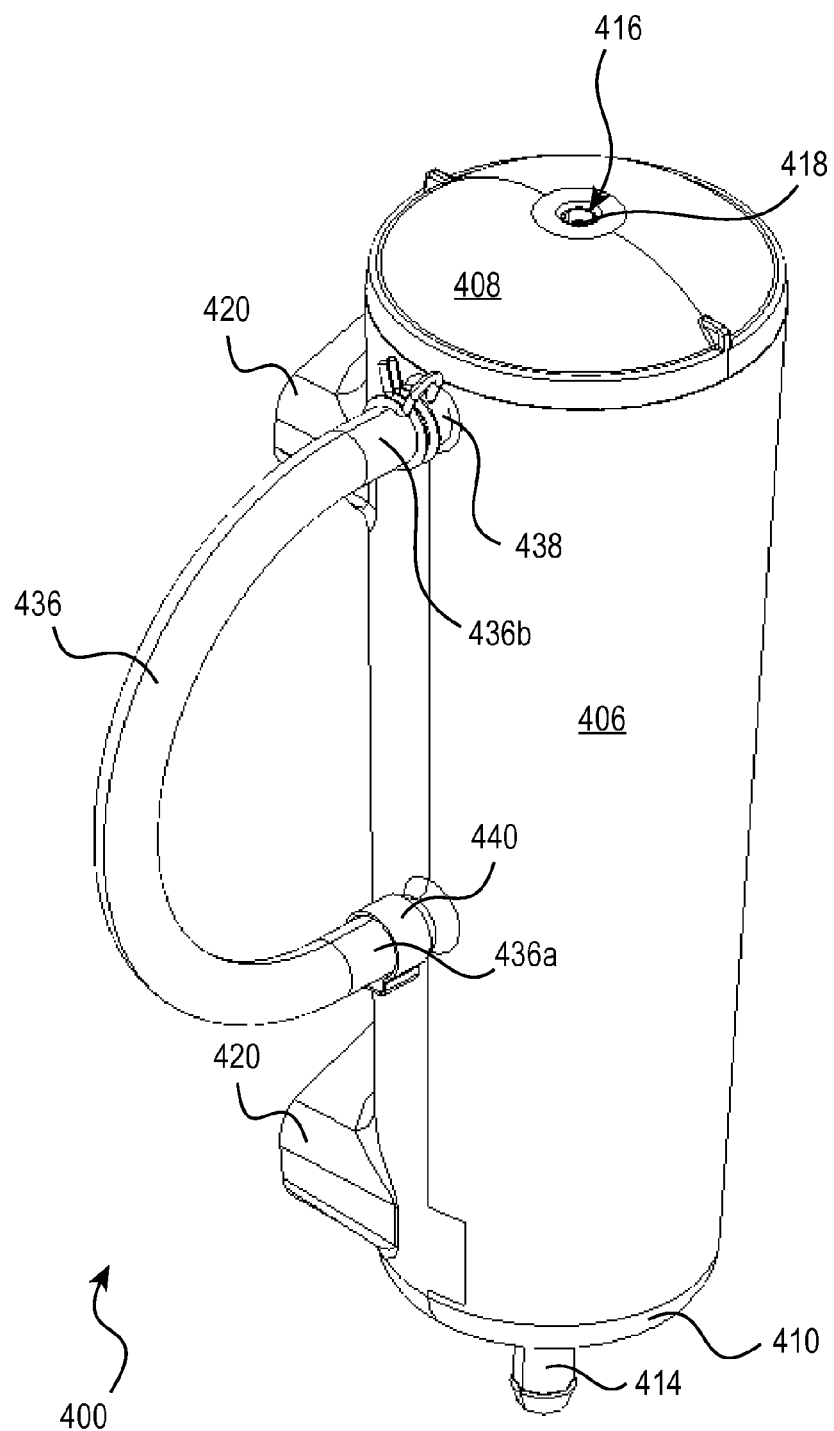
FIG. 13 is a perspective view, taken from a top, front and left side, of the container of FIG. 12.
Figure 14:
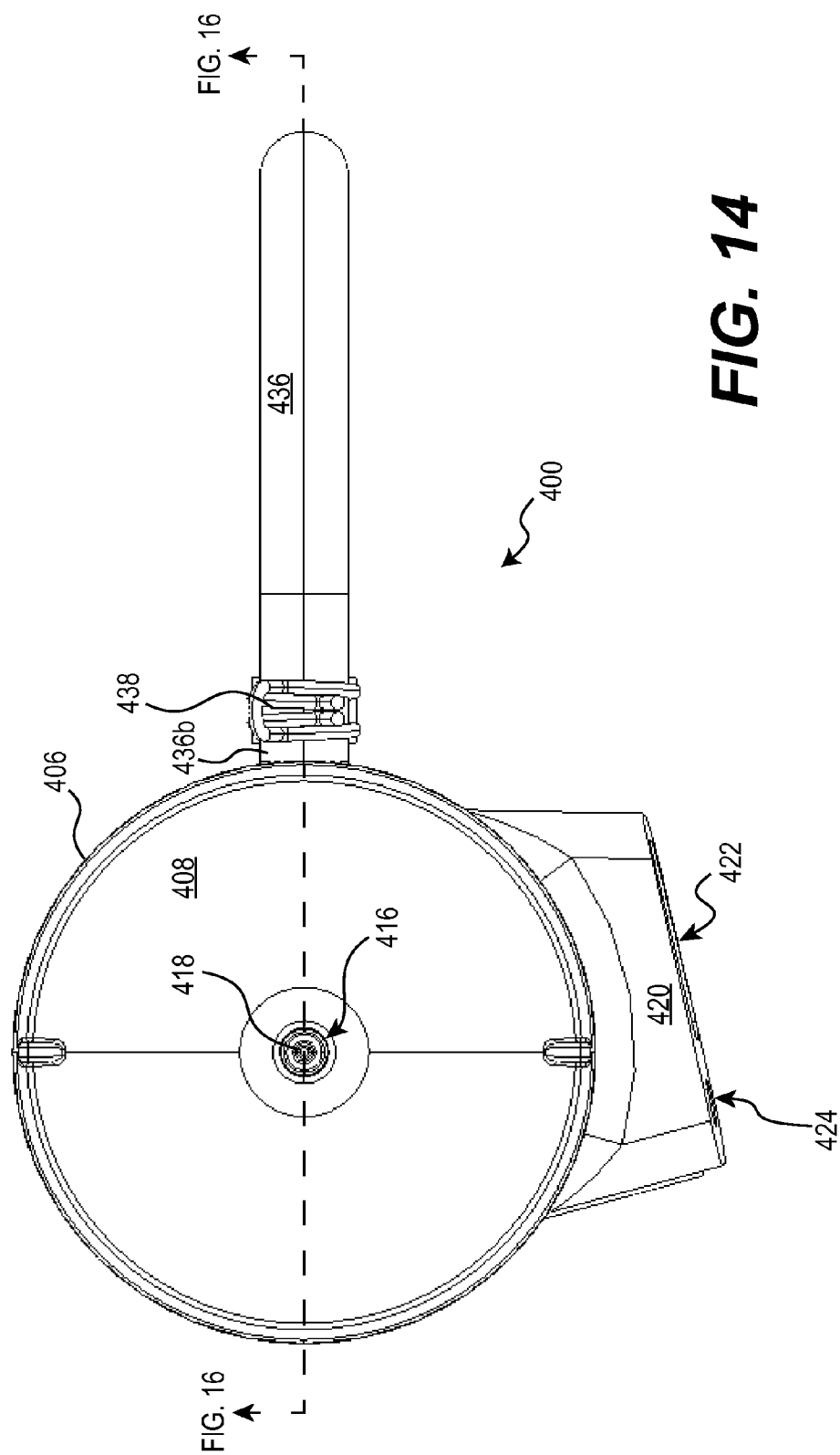
FIG. 14 is a top plan view of the container of FIG. 12.
Figure 15:
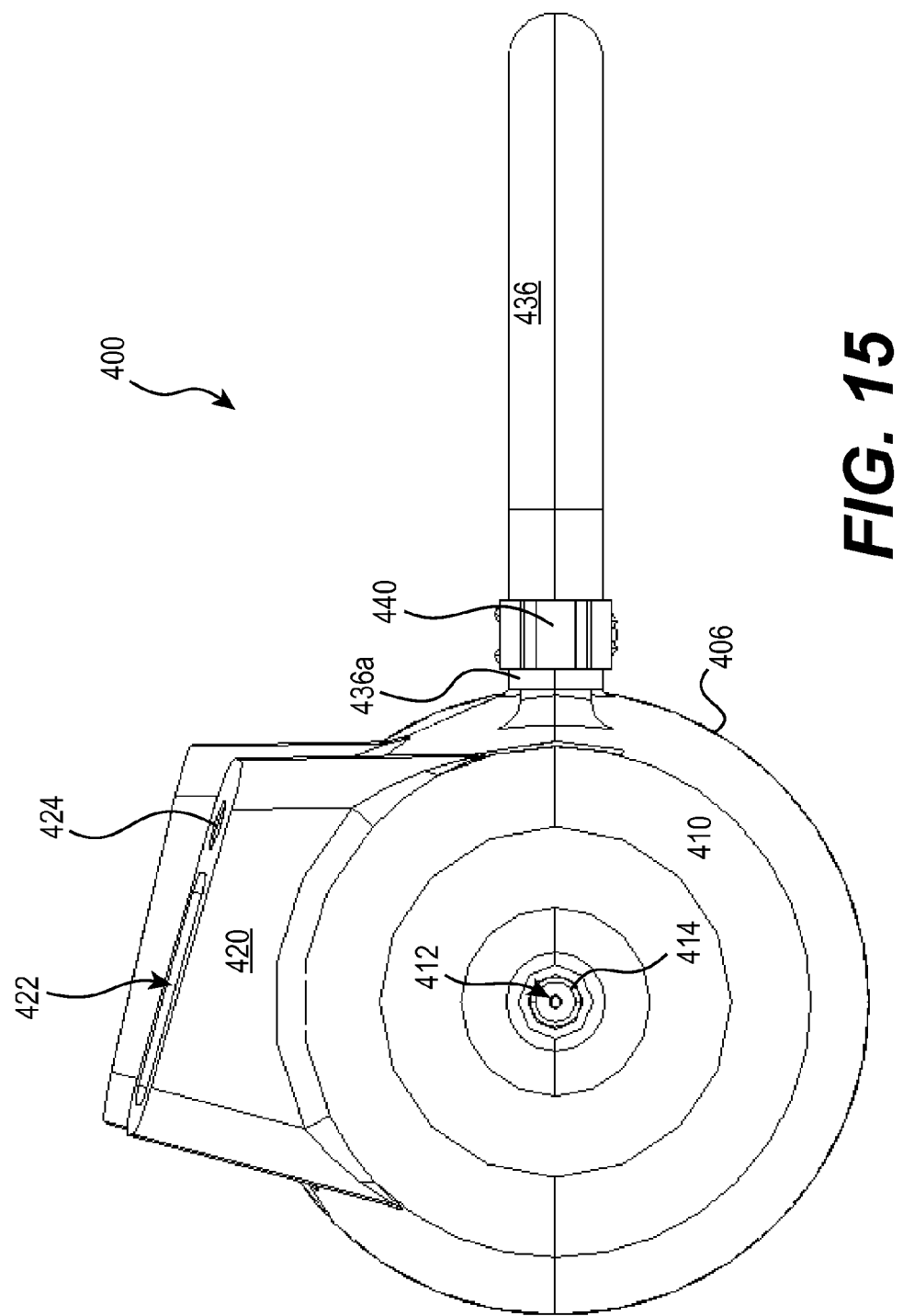
FIG. 15 is a bottom plan view of the container of FIG. 12.

FIGS. 10 and 11 show different embodiments of the container 300. Features of the embodiments of FIGS. 10 and 11 that are similar to features of the embodiment of FIGS. 7 to 9 have been labeled with the same reference numbers and will not be discussed herein in detail. Corresponding features of the embodiments of FIGS. 10 and 11 that are different from the embodiment of FIGS. 7 to 9 discussed above have been labeled with the same reference number followed by either one apostrophe (FIGS. 10A and 10B) or two apostrophes (FIG. 11) and will be discussed below with regard to their differences.

FIGS. 10A and 10B show an embodiment of a container 300' having a vent tube 332' defining a vent passage 334'. The vent passage 334' does not include a check valve but it is contemplated that a check valve could be included. The vent tube 332' has an upper opening 342' fluidly communicating with the vent port 330 and a lower opening 340' fluidly communicating with the exterior of the container 300'. The upper opening 342' is larger in diameter than the lower opening 340'. The vent passage 334', which is circular in cross-section, tapers from its upper end connected to the upper opening 342' to its lower end connected to the lower opening 340'. In the illustrated embodiment, the upper and lower openings 342' and 340' span the entire area of the upper and lower ends of the vent passage 334'. It is contemplated that the upper and lower opening 342', 340' could be smaller than the upper and lower ends of the vent passage 334'. It is also contemplated that the vent passage 334' could not taper between the upper and lower openings 342', 340', or that only a portion of the vent passage 334' therebetween could be tapering.

FIG. 11 shows another embodiment of a container 300" in which the vent port 330" is defined in the center of the top wall 308 of the container 300". A vent tube 332" in the form of a nipple 332" extends upwards from the top wall 308. The vent passage 334" extends upwards from the vent port 330" to the outlet 340" formed by the top end of the nipple 332".

A container vent tube 344" is connected at one end to the nipple 332" and extends to the top, rear corner of the drive unit 12, which is one of the highest point of the drive unit 12 over the entire range of tilt/trim angles. The end of the hose 344" opposite to the end attached to the nipple 332" is open and thus vented to the space inside the cowling 38. The fuel reservoir 37 is also similarly vented by another tube (not shown) leading to one of the highest points of the drive unit 12. It is contemplated that the container vent tube 344" could be connected to the fuel reservoir vent tube by a T-joint, and thereby vented to the space inside the cowling 38. It is also contemplated that the container tube 344" and the fuel reservoir vent tube could be restrained together, by a tie-wrap or other such fastener, at the top, rear corner of the cowling 38.

With reference to FIGS. 12 to 18, yet another embodiment of a container 400 will now be described in more detail.

As can be seen in FIGS. 12 to 17, the container 400 has a curved side wall 406 in the form of a shallow angled conical frustum, a top wall 408 extending across the upper end of the side wall, and a bottom wall 410 extending across the lower end of the side wall. The top wall 408 forms a removable cover that is press-fit to the side wall 406. The diameter of the side wall 406 is larger at the top than at the bottom. It is contemplated that the container 400 could have a different shape, for example, the container 400 could be cylindrical or cubical. A pair of mounting members 420 extends outwards from the outer surface of the side wall 406. An upper mounting member 420 is disposed near the top wall 408 and a lower mounting member 420 is disposed just above the bottom wall 410 and aligned with the upper mounting member 420 in the circumferential direction. Each mounting member 420 has a rectangular slot 422 and a circular slot 424 disposed spaced apart in a circumferential direction of the side wall 406. The slots 422, 424 receive corresponding projections (not shown) formed on a complementary mounting member (not shown). When looking from the side (as in FIG. 12), the circular slot 424 is disposed forward of the rectangular slot 422 in the upper mounting member while the lower mounting member 420 has the circular slot 424 disposed rearward of the rectangular slot 422. The inverted arrangement of the slots 422, 424 in the two mounting members ensures installation of the container 400 in the proper orientation with the top wall 408 facing upwards and the bottom wall 410 facing downwards. It is contemplated that the slots 422, 424 could have shapes other than that shown herein, and that the slots 420, 424 could be disposed in a different relative configuration than as shown herein. It is also contemplated that the mounting members 420 could have projections instead of, or in addition to, the slots 422, 424. It is contemplated that the container 400 could have a mounting member 420 that is different from the one shown herein.

Figure 18:
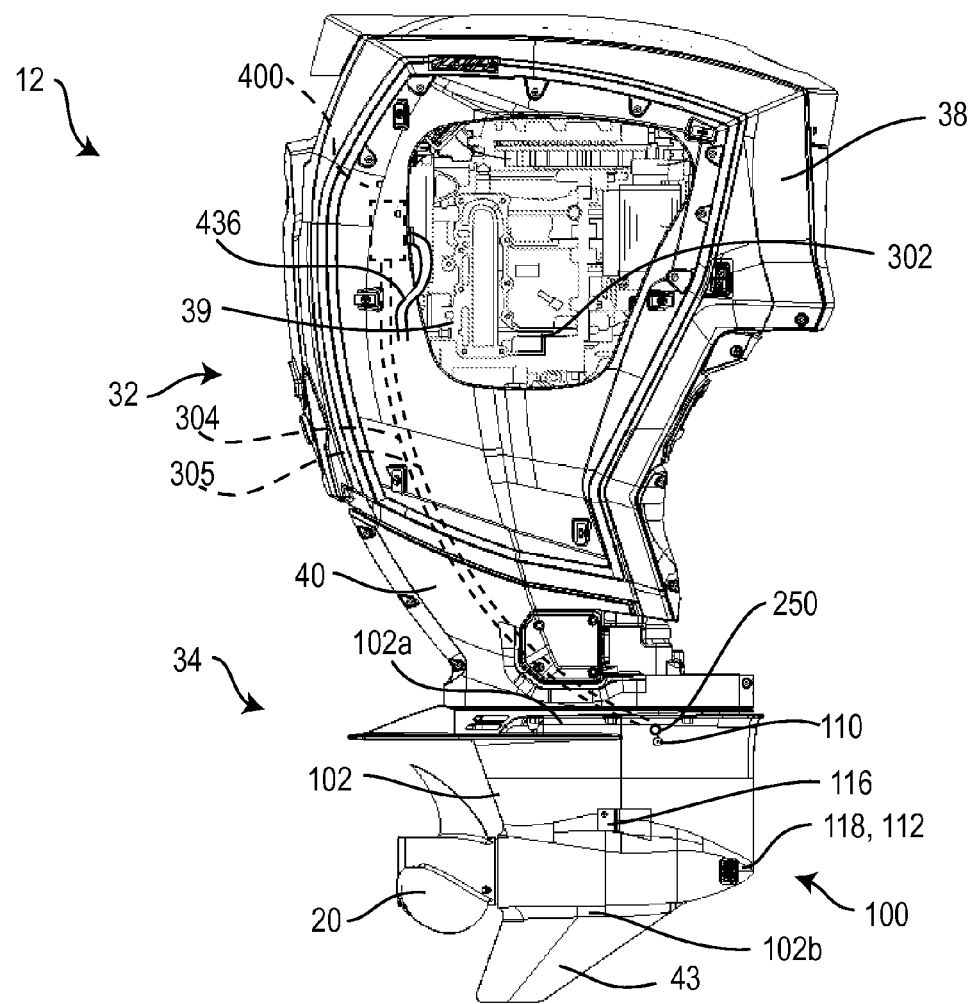
FIG. 18 is a right side elevation view of the outboard engine of FIG. 1 with a right side panel of a cowling removed and showing the container and conduit of FIG. 12.

With reference to FIG. 18, the container 400 (shown schematically in FIG. 18) is disposed inside the cowling 38 in the upper portion 32 of the drive unit 12. The container 400 is mounted to the inside surface of the right side of the cowling 38 adjacent to the opening 39 which is covered by the removable right side panel 38a. The container 400 is mounted just rearward of the opening 39 so that it can be accessed by removing the removable side panel 38a. The container 400 is disposed higher than the container 300 described above which is mounted to the oil reservoir 37. It is contemplated that the container 400 could be connected to a different portion of the inner cowling surface proximate the opening 39 than as shown herein. It is contemplated that the container 400 could be connected to the left side of the cowling 38. It is contemplated that the container 400 could be disposed in another location outside of the gear case 102 than as shown in the illustrated embodiment.

Figure 16:
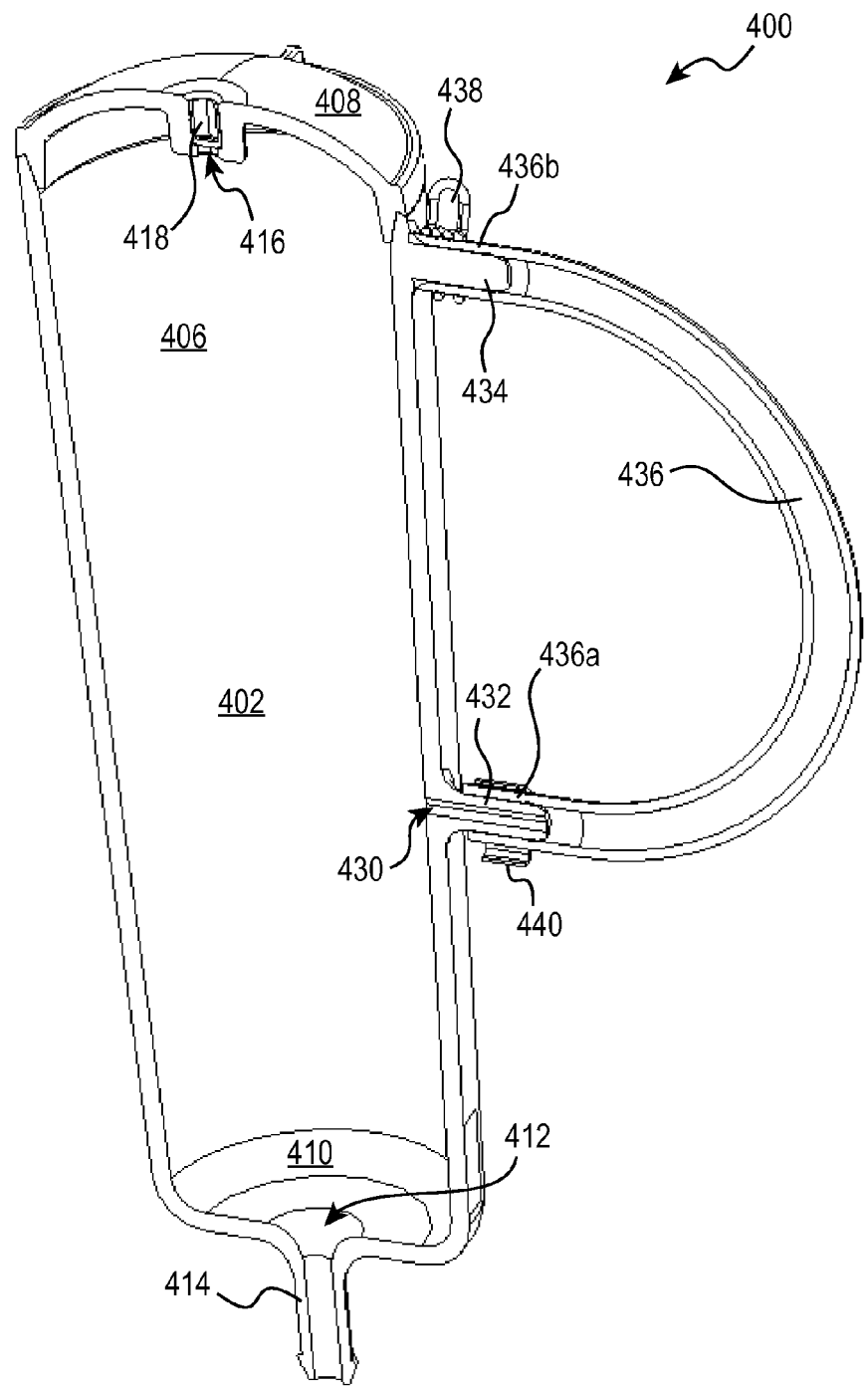
FIG. 16 is a cross-sectional and perspective view, taken from a top, front and right side, of the container of FIG. 12 and along the line 16-16 of FIG. 14.
Figure 17:
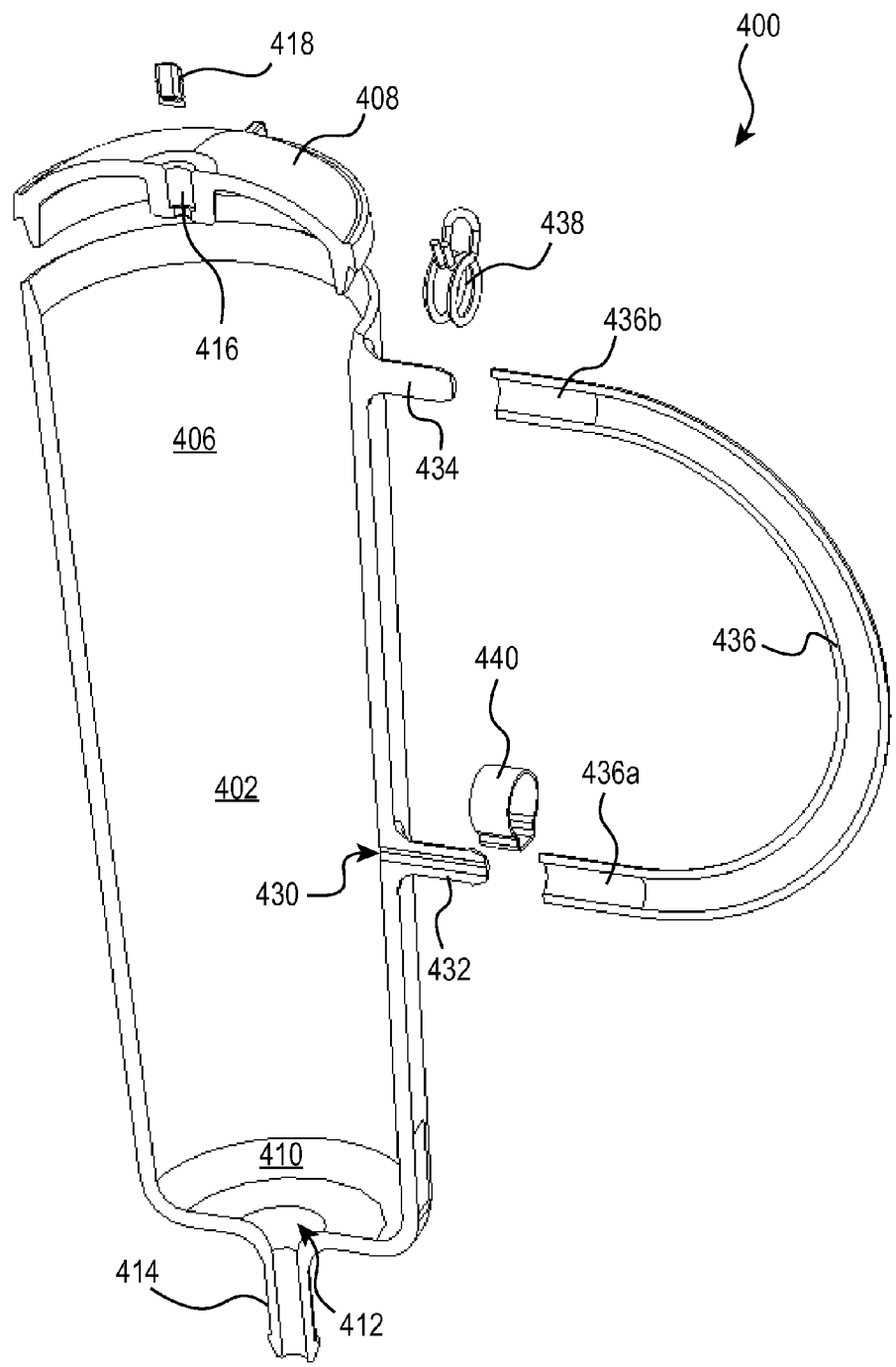
FIG. 17 is a partially exploded, cross-sectional and perspective view, taken from a top, front and right side, of the container of FIG. 12 and along the line 16-16 of FIG. 14.

As can be seen in FIGS. 16 and 17, the container 400 defines an expansion chamber 402, which is similar to the expansion chamber 302 of the containers 300, 300', 300" described above. Similar to the container 300, 300', 300" described above, the conduit 304 is connected to the container 400 in order to fluidly communicate the expansion chamber 402 with the expansion port 250. The expansion chamber 402 is fluidly connected to the gear case 102, specifically the driveshaft passage 200 and the transmission chamber 126 thereof, via the expansion passage 305 of the conduit 304. The expansion chamber 402 encloses a sufficient volume of air to allow for temperature-related variation of the volume of lubricant in the gear case 102.

The bottom wall 410 has an opening 412 (seen in FIGS. 16 and 17). A nipple 414 is disposed around the opening 412. One end of the conduit 304 fits around the nipple 414 and the other end of the conduit 304 is connected to the expansion port 250.

Turning again to FIGS. 12 to 17, the top wall 408 has an opening 416 extending therethrough. A pressure release valve 418 (best seen in FIGS. 16 and 17) is disposed in the opening 416. In the illustrated embodiment of the container 400, the pressure release valve 418 is set to open when the pressure in the expansion chamber 402 exceeds 29 psi. It is contemplated that the pressure release valve 418 could be selected to open at a different pressure.

As can be seen in FIGS. 16 and 17, another opening 430 is formed in the side wall 406 and serves as a vent and a fill indicator while lubricant is being filled into the gear case 102. A nipple 432 extends outwardly from the side wall 406 around the opening 430. A conduit 436 has one end 436a clamped around the nipple 432 by a clamp 440. A peg 434 projects outwardly from the sidewall 406 and vertically above the opening 430. The other end 436b of the conduit 436 is releasably clamped around the peg 434 with a releasable clamp 438. When clamped to the peg 434, the opening of the conduit 436 at the end 436b is closed. The conduit opening at the end 436b can be opened by unclamping the clamp 438 and releasing the end 436b from the peg 434. The opening 430 is thus selectively open to atmosphere (i.e. fluidly communicating with the space outside the gear case 102 and the expansion chamber 402) when the end 436b of the conduit 436 is freed from the peg 434.

During operation of the outboard engine 10, the end 436a is connected to the nipple 432 and the end 436b is connected to the peg 434 so that the container 400 is effectively closed unless the pressure therein exceeds the set point of the pressure release valve 418.

While lubricant is being pumped into the gear case 102, the end 436b is unclamped and released from the peg 434. Thus, while the lubricant is being filled into the gear case 102, the container 400 is vented through the opening 430 so that air being displaced from the driveshaft passage 200 and the transmission chamber 126 can flow out via the opening 430 and the conduit 436.

When lubricant is being pumped into the gear case 102 so as to partially fill the expansion chamber 402, the opening 430 also serves as a fill indicator. The conduit 436 is positioned to extend downwards from the end 436a, through the opening 39 such that the free end 436b is disposed outside the cowling 38 (shown schematically in FIG. 18). When the level of the lubricant in the expansion chamber 402 reaches the opening 430, the lubricant begins to flow into the conduit 436 and out of its free end 436b, thereby providing a visual indication that the lubricant has reached the desired level and prompting the user to stop further pumping of lubricant. It is contemplated that the opening 430 could be formed lower or higher than as shown herein. It is contemplated that the opening 430 could not be used as a fill indicator, and that a separate fill indicator could provided, for example, by a transparent or semi-transparent portion of the container 400 that would visible from outside the cowling 38.

It is contemplated that the clamp 440 could also be a releasable clamp and that the conduit 436 could be completely disconnected from the container 400 by disconnecting its end 436a from the nipple 432, for example, if the container 400 is provided with a cover for sealing the opening 430 while the outboard engine 10 is in operation.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A gear case assembly for a marine propulsion system comprising:
    a gear case having a first end and a second end, the first end being adapted to connect the gear case to a remainder of the marine propulsion system, the second end being disposed opposite the first end;
    a driveshaft disposed at least in part in the gear case;
    a propeller shaft operatively connected to an end of the driveshaft, the propeller shaft being disposed at an angle to the driveshaft;
    a transmission chamber defined in the gear case, the end of the driveshaft and at least a portion of the propeller shaft being disposed in the transmission chamber;
    a driveshaft passage defined by the gear case and fluidly connected to the transmission chamber, the driveshaft passage housing at least a portion of the driveshaft, the driveshaft passage being disposed between the first end of the gear case and the transmission chamber in a direction parallel to the driveshaft axis;
    a expansion port defined in the gear case; and
    a container defining an expansion chamber, the container being disposed outside the gear case,
    the expansion port fluidly communicating the transmission chamber with the expansion chamber, the expansion port fluidly communicating with the transmission chamber via the driveshaft passage.

2. The gear case assembly of claim 1, wherein the expansion port is defined in the first end of the gear case.

3. The gear case assembly of claim 1, wherein
    the gear case defines a lubricant opening in the driveshaft passage; and
    the expansion port fluidly communicates with the lubricant opening.

4. The gear case assembly of claim 3, wherein the gear case defines a connection passage fluidly connecting the expansion port and the lubricant opening.

5. The gear case assembly of claim 4, wherein the connection passage fluidly communicates with a lubricant filling port, the lubricant filling port fluidly communicating the transmission chamber with an exterior of the gear case.

6. The gear case assembly of claim 5, further comprising an expansion conduit defining an expansion passage fluidly communicating the expansion port with the expansion chamber.

7. The gear case assembly of claim 6, further comprising:
    a transmission operatively connected to the driveshaft and the propeller shaft, the transmission being selectively operatively connected to at least one of the propeller shaft and the driveshaft, the driveshaft thereby selectively driving the propeller shaft via the transmission; and
    a transmission actuator disposed in an actuator chamber defined by the gear case, the actuator chamber being sealed from the transmission chamber;
    wherein a volume of the expansion chamber and the expansion passage is at least as great as a volume of the gear case occupied by the actuator chamber.

8. The gear case assembly of claim 1, wherein at least a portion of the container defining the expansion chamber is at least partially transparent.

9. The gear case assembly of claim 8, wherein the portion of the container has defined thereon a visual indicator for indicating the level of lubricant within the container.

10. The gear case assembly of claim 9, wherein the visual indicator is a fill line.

11. The gear case assembly of claim 1, wherein the container comprises a vent port fluidly communicating the expansion chamber with an exterior of the container.

12. The gear case assembly of claim 11, wherein the vent port selectively fluidly communicates the expansion chamber with the exterior of the container.

13. The gear case assembly of claim 12, wherein the container comprises a check valve for selectively preventing entry of water from an exterior of the container into the expansion chamber through the vent port.

14. The gear case assembly of claim 13, wherein the check valve is a ball valve.

15. The gear case assembly of claim 13, wherein the vent port fluidly communicates with a vent passage, and the check valve is disposed in the vent passage.

16. A marine outboard engine comprising:
    a powerhead comprising an engine;
    a midsection connected to the powerhead;
    a gear case having a first end and a second end, the first end being connected to the midsection, the second end being disposed opposite the first end;
    a driveshaft disposed at least in part in the gear case and being operatively connected to the engine at a first end;
    a propeller shaft being disposed at an angle to the driveshaft and operatively connected thereto;
    a propeller mounted on the propeller shaft;
    a transmission chamber defined in the gear case, a second end of the driveshaft disposed opposite the first end of the driveshaft and at least a portion of the propeller shaft being disposed in the transmission chamber;
    an expansion chamber defined by a container disposed outside the gear case;
    an expansion port defined in the gear case and fluidly communicating the transmission chamber with the expansion chamber,
        wherein at least one of the midsection and the powerhead comprises a cowling, the cowling comprising an opening, the container being disposed proximate the opening such that the container is visible to a user through the opening.

17. The marine outboard engine of claim 16, wherein the expansion chamber is disposed in one of the midsection and the powerhead.

18. The marine outboard engine of claim 16, wherein the container is connected to at least one of the powerhead and the midsection.

19. The marine outboard engine of claim 18, wherein the cowling further comprises a removable panel selectively covering the opening.

20. The marine outboard engine of claim 19, wherein at least a portion of the container is at least partially transparent, the portion of the container being visible through the opening.

21. The marine outboard engine of claim 18, wherein a container opening defined in the container selectively communicates with a space outside the expansion chamber and the gear case.

22. The marine outboard engine of claim 21, further comprising a conduit fluidly communicating with the container opening, the conduit comprising a first end connected to the container and a second end, wherein the first end fluidly communicates with the container opening, and the conduit is sufficiently long such that the second end is selectively disposed outside the cowling.

* * * * *